(12) United States Patent
Kin et al.

(10) Patent No.: US 10,739,861 B2
(45) Date of Patent: Aug. 11, 2020

(54) LONG DISTANCE INTERACTION WITH ARTIFICIAL REALITY OBJECTS USING A NEAR EYE DISPLAY INTERFACE

(71) Applicant: Facebook Technologies, LLC, Menlo Park, CA (US)

(72) Inventors: Kenrick Cheng-kuo Kin, Vancouver, WA (US); Albert Peter Hwang, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 246 days.

(21) Appl. No.: 15/867,634

(22) Filed: Jan. 10, 2018

(65) Prior Publication Data

US 2019/0212827 A1 Jul. 11, 2019

(51) Int. Cl.
*G06F 3/01* (2006.01)
*G06F 3/0481* (2013.01)
*G02B 27/01* (2006.01)
*G02B 27/00* (2006.01)
*G06K 9/00* (2006.01)
*G06F 3/0484* (2013.01)
(Continued)

(52) U.S. Cl.
CPC ......... *G06F 3/017* (2013.01); *G02B 27/0093* (2013.01); *G02B 27/017* (2013.01); *G02B 27/0172* (2013.01); *G02B 27/0179* (2013.01); *G06F 3/013* (2013.01); *G06F 3/04815* (2013.01); *G02B 2027/0138* (2013.01); *G02B 2027/0178* (2013.01); *G02B 2027/0187* (2013.01); *G06F 3/0482* (2013.01); *G06F 3/04842* (2013.01); *G06F 2203/04808* (2013.01); *G06K 9/00355* (2013.01); *G06T 19/006* (2013.01)

(58) Field of Classification Search
CPC .... G06F 3/017; G06F 3/04815; G06F 3/0482; G06F 3/04842; G06F 2203/04808; G06F 3/013; G06F 3/011; G02B 27/0093; G02B 27/017; G02B 27/0179; G02B 27/0172; G02B 2027/0138; G02B 2027/0187; G05B 2219/2614; G06T 19/006

See application file for complete search history.

(56) References Cited

U.S. PATENT DOCUMENTS 9,785,247 B1 * 10/2017 Horowitz .............. G06F 3/0346
10,429,941 B2 * 10/2019 Kamoda ............ G02B 27/0172
(Continued)

*Primary Examiner* — Amy M Levy
(74) *Attorney, Agent, or Firm* — Fenwick & West LLP

(57) ABSTRACT

A system includes a near eye display (NED) that comprises an optical assembly with an electronic display, an imaging sensor configured to capture images of a user's hands, and an eye imaging sensor configured to capture images of an eye of the user. The system also includes a controller configured to determine eye tracking information using the captured images of the eye, the eye tracking information indicating a gaze orientation, wherein the gaze orientation terminates at first location. The controller determines that a pose of the user's hand indicates a pinch gesture based on the captured images of the user's hands. The controller also identifies an object in the local area that is at the first location, and updates the display instructions to cause the electronic display to display an indication of a selection of the object in an artificial reality environment.

20 Claims, 22 Drawing Sheets

(51) Int. Cl.
*G06F 3/0482* (2013.01)
*G06T 19/00* (2011.01)

(56) References Cited

U.S. PATENT DOCUMENTS

| | | | | |
|---|---|---|---|---|
| 2014/0104274 | A1* | 4/2014 | Hilliges | G06F 3/011 |
| | | | | 345/424 |
| 2014/0184496 | A1* | 7/2014 | Gribetz | G02B 27/017 |
| | | | | 345/156 |
| 2015/0202962 | A1* | 7/2015 | Habashima | B60K 35/00 |
| | | | | 345/633 |
| 2015/0205362 | A1* | 7/2015 | Park | G06F 3/017 |
| | | | | 345/156 |
| 2015/0234477 | A1* | 8/2015 | Abovitz | G06F 3/017 |
| | | | | 382/103 |
| 2016/0320855 | A1* | 11/2016 | Katz | G06F 3/011 |
| 2018/0032139 | A1* | 2/2018 | Whiteford | G06F 3/011 |
| 2018/0157398 | A1* | 6/2018 | Kaehler | G06F 3/011 |
| 2018/0239144 | A1* | 8/2018 | Woods | G02B 27/0172 |
| 2018/0308377 | A1* | 10/2018 | Pena-Rios | G06F 3/011 |
| 2018/0348986 | A1* | 12/2018 | Sawaki | H04N 13/366 |
| 2019/0129607 | A1* | 5/2019 | Saurabh | G06F 3/04847 |

* cited by examiner

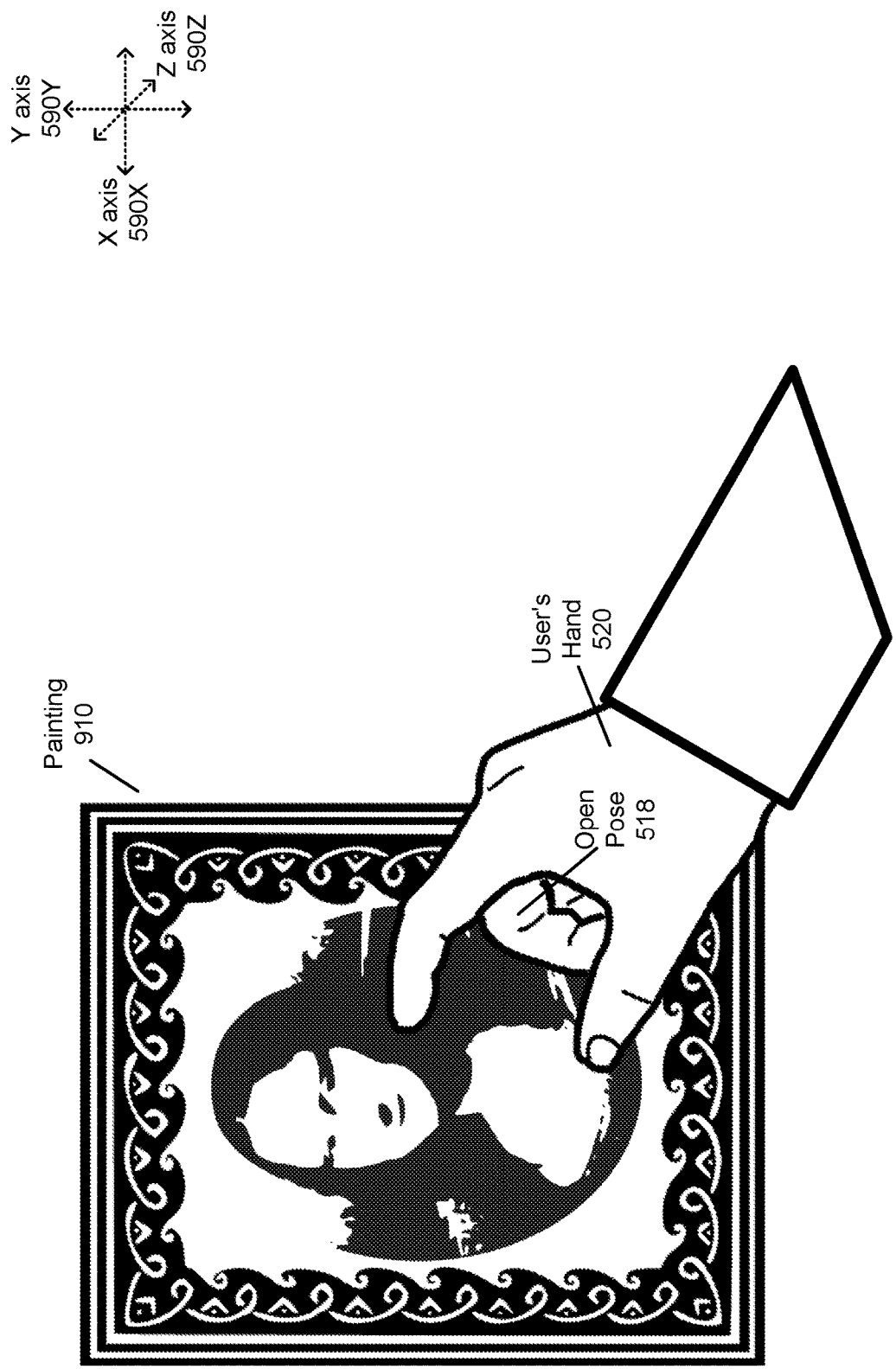

LONG DISTANCE INTERACTION WITH ARTIFICIAL REALITY OBJECTS USING A NEAR EYE DISPLAY INTERFACE

BACKGROUND

The present disclosure generally relates to object and eye tracking, and specifically to long distance interaction with artificial reality objects in an artificial reality system.

Artificial reality systems typically rely on wearable devices that have smaller form factors than classical virtual reality (VR) head mounted devices. The use of artificial reality systems presents new challenges in user interaction. Previous methods of user interaction with the local area may not be sufficient or optimal in an artificial reality system. For example, without the use of artificial reality, a user may need to interact physically with a device in a local area in order to enable a change in that device. However, with the user of artificial reality, both the device and the user experience may be upgraded to allow the user to cause a change in the device using methods other than simply physical interaction. However, such changes in user experience should be intuitive for the user to understand and should be technically feasible. Current method of user interaction in artificial reality are not readily intuitive and do not exploit the technical capabilities of an artificial reality system, and thus are not optimal for use.

SUMMARY

A near-eye display (NED) system provides graphical elements (e.g., an overlay) as a means to control physical objects as part of an artificial reality environment. The system described herein includes a near eye display (NED) that comprises an optical assembly that is and has an electronic display configured to display images in accordance with display instructions, an imaging sensor configured to capture images of a user's hands, and an eye imaging sensor configured to capture images of an eye of the user as the eye looks into a local area surrounding the NED. The system also includes a controller configured to determine eye tracking information using the captured images of the eye, the eye tracking information indicating a gaze orientation, wherein the gaze orientation terminates at first location. The controller determines that a pose of the user's hand indicates a pinch gesture based on the captured images of the user's hands. The pinch gesture is formed by a movement of the user's thumb and index finger such that a distance between the distal ends of the user's thumb and index finger are within a threshold value, and that the gaze orientation is between the distal ends of the user's thumb and index finger. The controller also identifies an object in the local area that is at the first location, and updates the display instructions to cause the electronic display to display an indication of a selection of the object in an artificial reality environment. This indication of the selection is displayed within a threshold distance of a position of the object in the artificial reality environment.

BRIEF DESCRIPTION OF THE DRAWINGS

FIG. 9A illustrates an exemplary NED filter display applied to a NED prior to the display of an informational menu due to a pinch gesture, in accordance with one or more embodiments.

Figure 1:
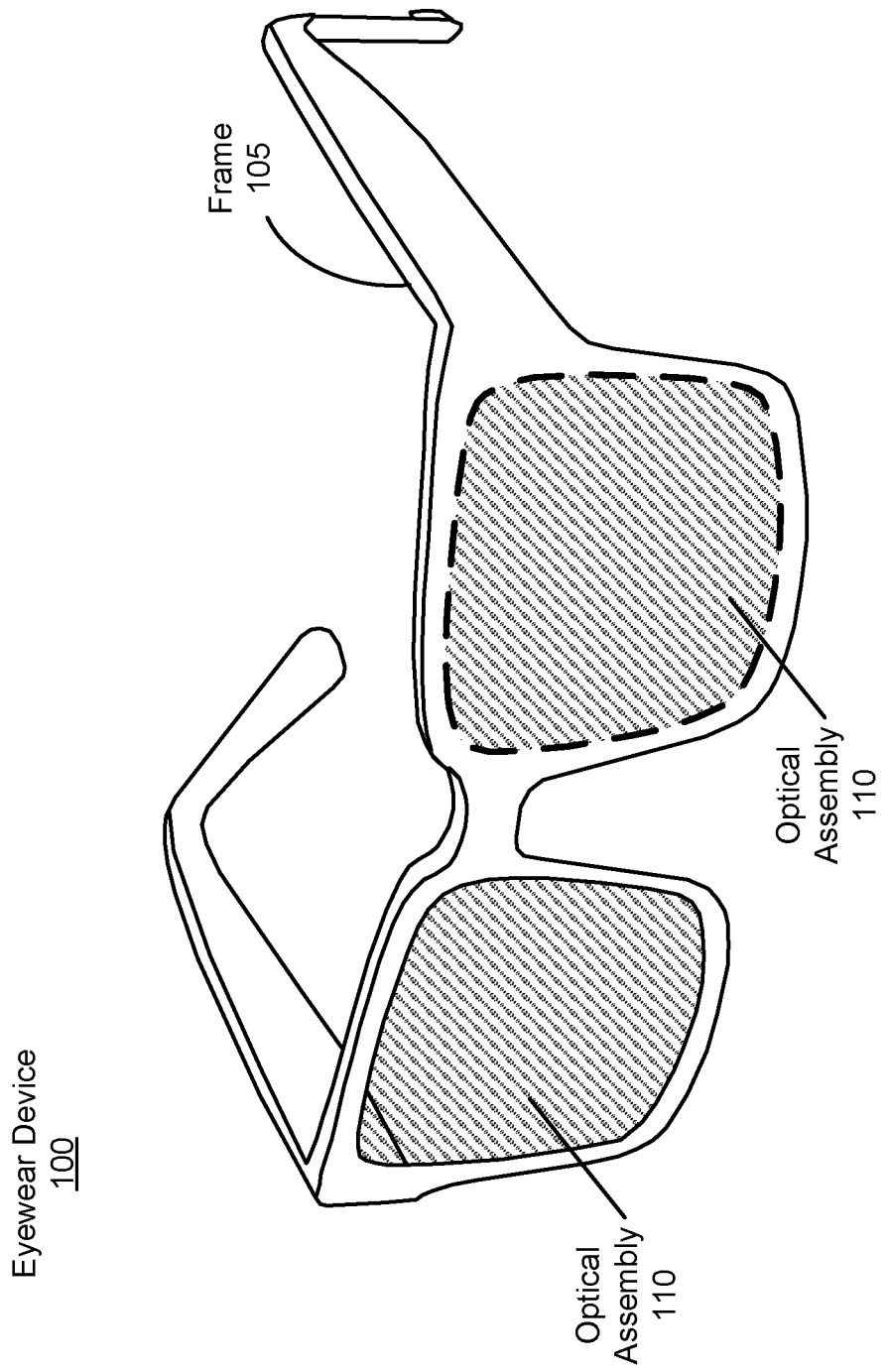
FIG. 1 is a diagram of an eyewear device, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality (VR), an artificial reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Additionally, in some embodiments an eyewear device includes an eye tracking system. The eye tracking system includes one or more light sources and a camera. The eyewear device also includes an optical assembly, which may include an electronic display or display path element (such as a waveguide display), a lens or lens stack (such as a powered optical element, corrective lens, or a UV lens), or a combination of displays and/or lenses.

The eye tracking system may be used, in conjunction with a system to track hand gestures, to determine a gaze orientation of the user's eyes and to determine whether that gaze orientation is also in between a user's thumb and index finger while in a pinch gesture. Such a method may be used by the system to determine a point of interest or element of focus in the local area or environment. Additional actions, such as a vertical movement of the user's hand, may be used to further interact with the point of interest or element in the local area. This allows for an increased accuracy in targeting environmental objects for a more fine grained manipulation in an artificial reality environment. In the following description, details will be presented regarding the eyewear with gaze orientation tracking, system for tracking the user's hand, as well as the method of manipulation of objects in the local area.

Near Eye Display System Overview

FIG. 1 is a diagram of an eyewear device 100, in accordance with one or more embodiments. In some embodiments, the eyewear device 100 is a near eye display (NED) for presenting media to a user. Examples of media presented by the eyewear device 100 include one or more images, text, video, audio, or some combination thereof. In some embodiments, audio is presented via an external device (e.g., speakers and/or headphones) that receives audio information from the eyewear device 100, a console (not shown), or both, and presents audio data based on the audio information. The eyewear device 100 can be configured to operate as an artificial reality NED. In some embodiments, the eyewear device 100 may augment views of a physical, real-world environment with computer-generated elements (e.g., images, video, sound, etc.).

The eyewear device 100 shown in FIG. 1 includes a frame 105 and an optical assembly 110, which is surrounded by a rim. The optical element 110 is substantially transparent (e.g., allows a percentage transmittance) in the visible spectrum and may also include a substantially transparent electronic display. The frame 105 is coupled to one or more optical elements. In some embodiments, the frame 105 may represent a frame of eye-wear glasses. The optical assembly 110 may be configured for users to see content presented by the eyewear device 100. For example, the eyewear device 110 can include at least one waveguide display assembly (not shown) for directing one or more image light to an eye of the user. A waveguide display assembly includes, e.g., a waveguide display, a stacked waveguide display, a stacked waveguide and powered optical elements, a varifocal waveguide display, or some combination thereof. For example, the waveguide display may be monochromatic and include a single waveguide. In some embodiments, the waveguide display may be polychromatic and include a single waveguide. In yet other embodiments, the waveguide display is polychromatic and includes a stacked array of monochromatic waveguides that are each associated with a different band of light, i.e., are each sources are of different colors. A varifocal waveguide display is a display that can adjust a focal position of image light emitted from the waveguide display. In some embodiments, a waveguide display assembly may include a combination of one or more monochromatic waveguide displays (i.e., a monochromatic waveguide display or a stacked, polychromatic waveguide display) and a varifocal waveguide display. Waveguide displays are described in detail in U.S. patent application Ser. No. 15/495,373, incorporated herein by references in its entirety.

In some embodiments, the optical assembly 110 may include one or more lenses or other layers, such as lenses for filtering ultraviolet light (i.e., sunglass lenses), polarizing lenses, corrective or prescription lenses, safety lenses, 3D lenses, tinted lenses (e.g., yellow tinted glasses), reciprocal focal-plane lenses, or clear lenses that do not alter a user's view. The optical assembly 110 may include one or more additional layers or coatings, such as protective coatings, or coatings for providing any of the aforementioned lens functions. In some embodiments, the optical assembly 110 may include a combination of one or more waveguide display assemblies, one or more lenses, and/or one or more other layers or coatings.

Figure 2:
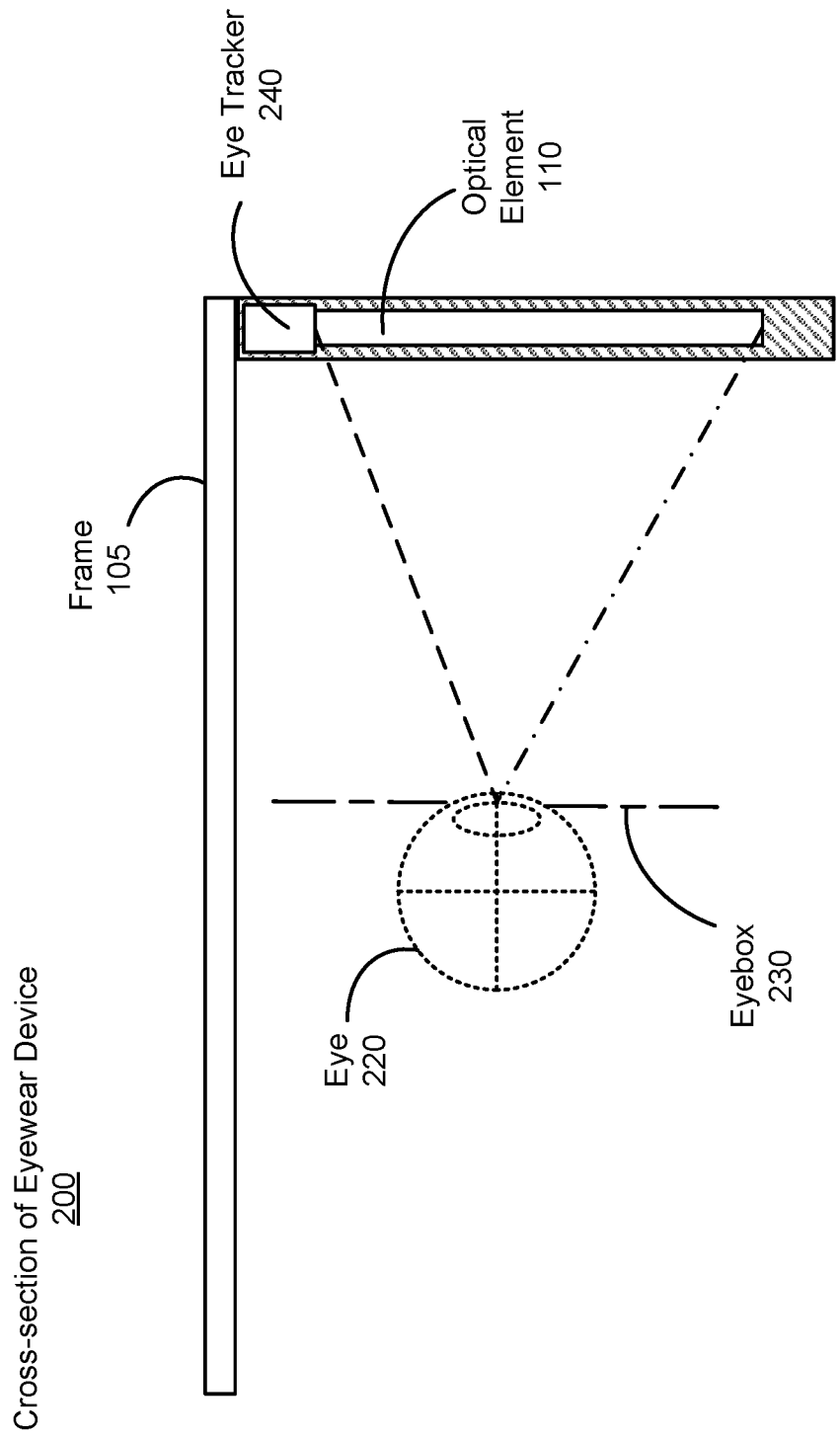
FIG. 2 is a cross section of the eyewear device of FIG. 1, in accordance with one or more embodiments.

FIG. 2 is a cross-section 200 of the eyewear device 100 illustrated in FIG. 1, in accordance with one or more embodiments. The optical assembly 110 is housed in the frame 105, which is shaded in the section surrounding the optical assembly 110. A user's eye 220 is shown, with dotted lines leading out of the pupil of the eye 220 and extending outward to show the eye's field of vision. An eyebox 230 shows a location where the eye 220 is positioned if the user wears the eyewear device 100. The eyewear device 100 includes an eye tracker 240.

The eye tracker 240 determines eye tracking information for the user's eye 220. The determined eye tracking information may include information about a position of the user's eye 220 in an eyebox 230, e.g., information about an angle of an eye-gaze. An eyebox represents a three-dimensional volume at an output of a display in which the user's eye is located to receive image light.

In one embodiment, the eye tracker 240 includes one or more light sources to illuminate the eye at a particular wavelength or within a particular band of wavelengths (e.g., infrared). The light sources may be placed on the frame 105 such that the illumination from the light sources are directed to the user's eye (e.g., the location of the eyebox 230). The light sources may be any device capable of producing visible or infrared light, such as a light emitting diode. The illumination of the user's eye by the light sources may assist the eye tracker 240 in capturing images of the user's eye with more detail. The eye tracker 240 receives light that is emitted from the light sources and reflected off of the eye 220. The eye tracker 240 captures images of the user's eye, and the eye tracker 240 or an external controller can analyze the captured images to measure a point of gaze of the user (i.e., an eye position), motion of the eye 220 of the user (i.e., eye movement), or both. The eye tracker 240 may be a camera or other imaging device (e.g., a digital camera) located on the frame 105 at a position that is capable of capturing an unobstructed image of the user's eye 220 (or eyes).

The one embodiment, the eye tracker 240 determines depth information for the eye 220 based in part on locations of reflections of the light sources. Additional discussion regarding how the eye tracker 240 determines depth information is found in, e.g., U.S. application Ser. No. 15/456,383 and U.S. application Ser. No. 15/335,634, both of which are hereby incorporated by reference. In another embodiment, the eye tracker 240 does not include light sources, but instead captures images of the user's eye 220 without additional illumination.

The eye tracker 240 can be embedded in an upper portion of the frame 105, but may be located at any portion of the frame at which it can capture images of the user's eye. While only one eye tracker 240 is shown in FIG. 2, the eyewear device 100 may include multiple eye trackers 240 per eye 220.

By tracking the user's gaze, the eye tracker 240 can be used to determine where a user is looking at. This can be combined with a system, described below, which determines the gesture of the same user's hands. The combination of both a gaze and a particular gesture may be detected by the system and, in response, the system may perform some action based on the combination of gesture and gaze.

Figure 3:
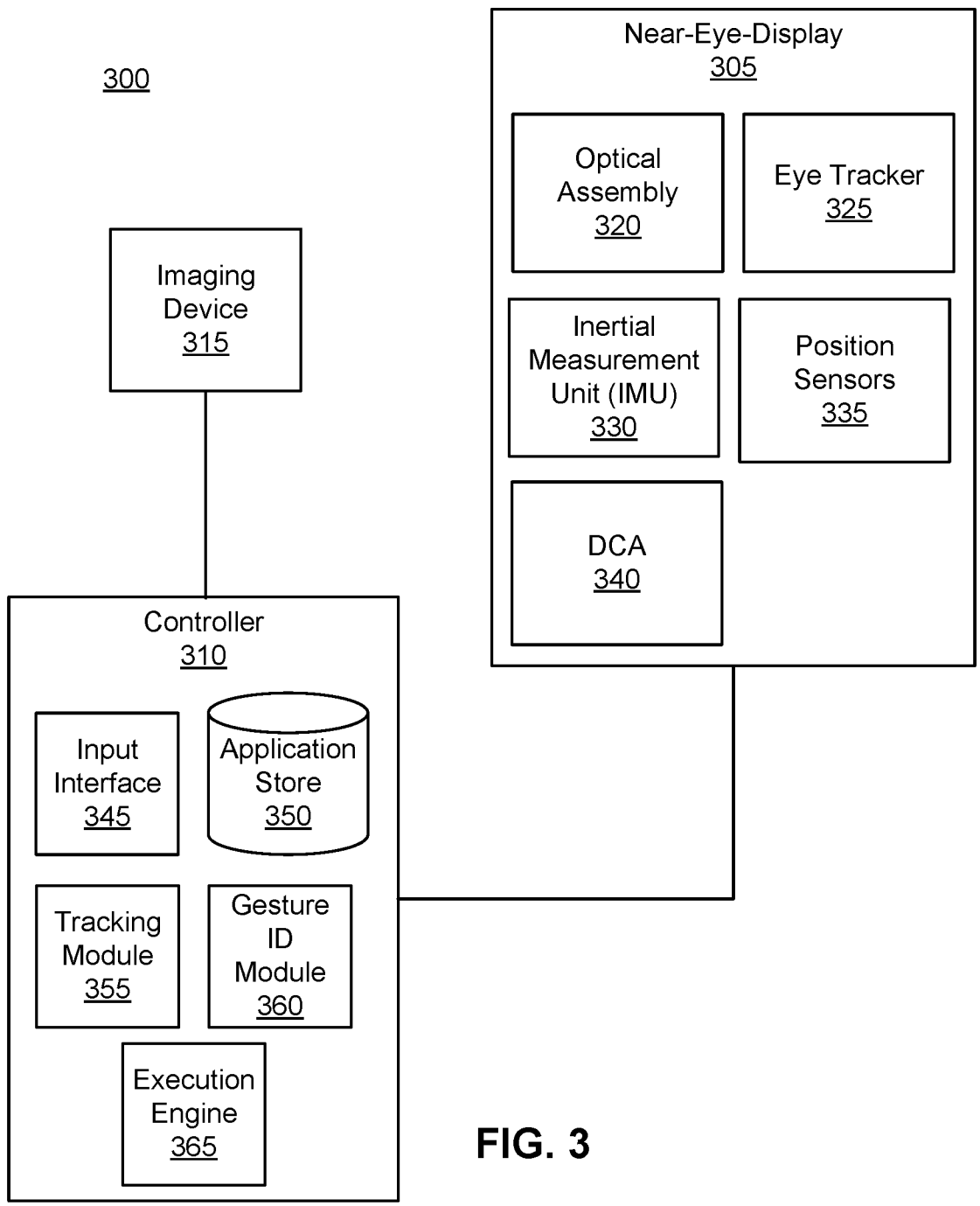
FIG. 3 is a block diagram of a NED system, in accordance with one or more embodiments.

FIG. 3 is a block diagram of a NED system 300, in accordance with one or more embodiments. The NED system 300 shown by FIG. 3 comprises a NED 305 coupled to a controller 310, with the controller 310 coupled to an imaging device 315. While FIG. 3 shows an example NED system 300 including one NED 305 and one imaging device 315, in other embodiments any number of these components may be included in the NED system 300. In alternative configurations, different and/or additional components may be included in the NED system 300. Similarly, functionality of one or more of the components can be distributed among the components in a different manner than is described here. For example, some or all of the functionality of the controller 310 may be contained within the NED 305. The NED system 300 may operate in an artificial reality environment.

The NED 305 presents content to a user. In some embodiments, the NED 305 is the eyewear device 100. Examples of content presented by the NED 305 include one or more images, video, audio, text, or some combination thereof. In some embodiments, audio is presented via an external device (e.g., speakers and/or headphones) that receives audio information from the NED 305, the controller 310, or both, and presents audio data based on the audio information. In some embodiments, the NED 305 operates as an artificial reality NED. In some embodiments, the NED 305 may augment views of a physical, real-world environment with computer-generated elements (e.g., images, video, sound, etc.).

The NED 305 includes an optical assembly 320 for each eye, an eye tracker 325, an inertial measurement unit (IMU) 330, one or more position sensors 335, and a depth camera array (DCA) 340. Some embodiments of the NED 305 have different components than those described here. Similarly, the functions can be distributed among other components in the NED system 300 in a different manner than is described here. In some embodiments, the optical assembly 320 displays images to the user in accordance with data received from the controller 310. In one embodiment, the optical assembly 320 is substantially transparent (e.g., by a degree of transmittance) to electromagnetic radiation in the visible spectrum.

The eye tracker 325 tracks a user's eye movement. The eye tracker 325 includes a camera for capturing images of the user's eye. An example of the placement of the eye tracker is shown in eye tracker 240 as described with respect to FIG. 2. Based on the detected eye movement, the eye tracker 325 may communicate with the controller 310 for further processing.

In some embodiments, the eye tracker 325 allows a user to interact with content presented to the user by the controller 310 based on the detected eye movement. Example interactions by the user with presented content include: selecting a portion of content presented by the controller 310 (e.g., selecting an object presented to the user), movement of a cursor or a pointer presented by the controller 310, navigating through content presented by the controller 310, presenting content to the user based on a gaze location of the user, or any other suitable interaction with content presented to the user.

In some embodiments, NED 305, alone or conjunction with the controller 310 or another device, can be configured to utilize the eye tracking information obtained from the eye tracker 325 for a variety of display and interaction applications. The various applications include, but are not limited to, providing user interfaces (e.g., gaze-based selection), attention estimation (e.g., for user safety), gaze-contingent display modes, metric scaling for depth and parallax correction, etc. In some embodiments, based on information about position and orientation of the user's eye received from the eye tracking unit, a controller (e.g., the controller 310) determines resolution of the content provided to the NED 305 for presentation to the user on the optical assembly 320. The optical assembly 320 may provide the content in a foveal region of the user's gaze (and may provide it at a higher quality or resolution at this region).

In another embodiment, the eye tracking information obtained from the eye tracker 325 may be used to determine the location of the user's gaze in the local area. This may be used in conjunction with a gesture detection system to allow the system to detect various combinations of user gesture and gazes. As described in further detail below, different combinations of user gaze and gestures, upon detection by the controller 310, may cause the controller 310 to transmit further instructions to devices or other objects in the local area, or execute additional instructions in response to these different combinations.

In some embodiments, the eye tracker 325 includes a light source that is used to project light onto a user's eye or a portion of the user's eye. The light source is a source of the light that is reflected off of the eye and captured by the eye tracker 325.

The IMU 330 is an electronic device that generates IMU tracking data based on measurement signals received from one or more of the position sensors 335. A position sensor 335 generates one or more measurement signals in response to motion of the NED 305. Examples of position sensors 335 include: one or more accelerometers, one or more gyroscopes, one or more magnetometers, another suitable type of sensor that detects motion, a type of sensor used for error correction of the IMU 330, or some combination thereof. The position sensors 335 may be located external to the IMU 330, internal to the IMU 330, or some combination thereof.

Based on the one or more measurement signals from one or more position sensors 335, the IMU 330 generates IMU tracking data indicating an estimated position of the NED 305 relative to an initial position of the NED 305. For example, the position sensors 335 include multiple accelerometers to measure translational motion (forward/back, up/down, left/right) and multiple gyroscopes to measure rotational motion (e.g., pitch, yaw, and roll). In some embodiments, the IMU 330 rapidly samples the measurement signals and calculates the estimated position of the NED 305 from the sampled data. For example, the IMU 330 integrates the measurement signals received from the accelerometers over time to estimate a velocity vector and integrates the velocity vector over time to determine an estimated position of a reference point on the NED 305. Alternatively, the IMU 330 provides the sampled measurement signals to the controller 310, which determines the IMU tracking data. The reference point is a point that may be used to describe the position of the NED 305. While the reference point may generally be defined as a point in space; however, in practice the reference point is defined as a point within the NED 305 (e.g., a center of the IMU 330).

The depth camera assembly (DCA) 340 captures data describing depth information of a local area surrounding some or all of the NED 305. The data that may be captured may include information captured from a structured light pattern projected on the local area, stereo images, time of flight data, or depth information captured using other depth measurement techniques. The DCA 340 can compute the depth information using the data (e.g., based on a captured portion of a structured light pattern), or the DCA 340 can send this information to another device such as the controller 710 that can determine the depth information using the data from the DCA 340.

The DCA 340 includes a light generator, an imaging device and a controller. The light generator of the DCA 340 is configured to illuminate the local area with illumination light in accordance with emission instructions. The imaging device of the DCA 340 includes a lens assembly, and a detector. The lens assembly is configured to receive light from a local area surrounding the imaging device and to direct at least a portion of the received light to the detector. The controller of the DCA 340 generates the emission instructions and provides the emission instructions to the light generator. The controller of the DCA 340 further determines depth information for the one or more objects based in part on the captured one or more images.

The imaging device 315 may be used to capture a representation of the user's hands over time for use in tracking the user's hands (e.g., by capturing multiple images per second of the user's hand). To achieve a more accurate capture, the imaging device 315 may be able to capture depth data of the local area or environment. This may be achieved by various means, such as by the use of computer vision algorithms that generate 3D data via detection of movement in the scene, by the emission of a grid pattern (e.g., via emission of an infrared laser grid) and detection of depth from the variations in the reflection from the grid pattern, from computation of time-of-flight of reflected radiation (e.g., emitted infrared radiation that is reflected), and/or from the user of multiple cameras (e.g., binocular vision, stereophotogrammetry). The imaging device 315 may be positioned to capture a large spatial area, such that all hand movements within the spatial area are captured. In one embodiment, more than one imaging device 315 is used to capture images of the user's hands. As described in further detail below, the captured images of the user's hands may be used to identify various gestures for the user. Upon detecting these gestures in combination with the satisfaction of other conditions, a controller may execute certain associated actions.

In another embodiment, the imaging device 315 may also capture images of one or more objects in the local area, and in particular the area encompassing the field of view of a user wearing an eyewear device that includes the NED 305. The imaging device 315 may also capture depth data of these one or more objects in the local area according to any of the methods described above.

Although the imaging device 315 is illustrated in FIG. 3 as being separate from the NED 305, in some embodiments the imaging device is attached to the NED 305, e.g., attached to the frame 105, and may also be part of the DCA 340.

The imaging device 315 may include one or more cameras, imaging sensor, one or more video cameras, any other device capable of capturing images, or some combination thereof. Additionally, the imaging device 315 may include one or more hardware and software filters (e.g., used to increase signal to noise ratio). Image tracking data is communicated from the imaging device 315 to the controller 310, and the imaging device 315 receives one or more calibration parameters from the controller 310 to adjust one or more imaging parameters (e.g., focal length, focus, frame rate, ISO, sensor temperature, shutter speed, aperture, etc.).

The controller 310 provides content to the NED 305 for presentation to the user in accordance with information received from the imaging device 315 or the NED 305. In the example shown in FIG. 3, the controller 310 includes an input interface 345, an application store 350, a tracking module 355, a gesture identification (ID) module 360, and an execution engine 365. Some embodiments of the controller 310 have different modules than those described herein. Similarly, the functions further described below may be distributed among components of the controller 310 in a different manner than is described herein. In one embodiment, the controller 310 is a component within the NED 305.

In one embodiment, the controller 310 includes an input interface 345 to receive additional external input. These external inputs may be action requests. An action request is a request to perform a particular action. For example, an action request may be to start or end an application or to perform a particular action within the application. The input interface 345 may receive input from one or more input devices. Example input devices include: a keyboard, a mouse, a game controller, or any other suitable device for receiving action requests. In another embodiment, the input interface 345 receives input from one or more radio frequency (RF) signal receivers. These may be used to receive radio signals from RF identifiers in the local area, and in some cases to determine a distance (based on signal strength) and position (based on triangulation or other method) of the RF identifier. After receiving an action request, the controller 310 performs an action corresponding to the action request. In some embodiments, the action performed by the controller 310 may include haptic feedback, which may be transmitted via the input interface 345 to haptic feedback devices.

The application store 350 stores one or more applications for execution by the controller 310. An application is a group of instructions, that when executed by a processor, generates content for presentation to the user. Content generated by an application may be in response to inputs received from the user via movement of the NED 305, the input interface 345, or the eye tracker 325. Examples of applications include: gaming applications, conferencing applications, video playback application, or other suitable applications.

The tracking module 355 tracks movements of the NED 305 and the hands of the user wearing the NED 305. To track the movement of the NED 305, the tracking module 355 uses information from the DCA 340, the imaging device 315, the one or more position sensors 335, the IMU 330, or some combination thereof. For example, the tracking module 355 determines a position of a reference point of the NED 305 in a mapping of a local area based on information from the NED 305. The tracking module 355 may also determine positions of the reference point of the NED 305 using data indicating a position of the NED 305 from the IMU 330. Additionally, in some embodiments, the tracking module 355 may use portions of data indicating a position or the NED 305 from the IMU 330 as well as representations of the local area from the DCA 340 to predict a future location of the NED 305. The tracking module 355 may provide the estimated or predicted future position of the NED 305 to the execution engine 365.

As noted, the tracking module 355 also tracks the user's hands, and the digits of the user's hands, in order to recognize various poses for the user's hand. Each pose indicates a position of a user's hand. By detecting a combination of multiple poses over time, the tracking module 355 is able to determine a gesture for the user's hand. These gestures may in turn translate into various inputs to the system. For example, a movement using a single digit in one direction may translate into a button press input in the system.

In one embodiment, the tracking module 355 uses a deep learning model to determine the poses of the user's hands. The deep learning model may be a neural network, such as a convolutional neural network, or a residual neural network. The neural network may take as input feature data extracted from raw data from the imaging device 315 of the hand, e.g., depth information of the user's hand, or data regarding the location of locators on any input device worn on the user's hands. The neural network may output the most likely pose that the user's hands are in. Alternatively, the neural network may output an indication of the most likely positions of the joints of the user's hands. The joints are positions of the user's hand, and may correspond to the actual physical joints in the user's hand, as well as other points on the user's hand that may be needed to sufficiently reproduce the motion of the user's hand in a simulation.

If the neural network outputs the positions of joints, the tracking module 355 additionally converts the joint data into a pose, e.g., using inverse kinematics principles. For example, the position of various joints of a user's hand, along with the natural and known restrictions (e.g., angular, length, etc.) of joint and bone positions of the user's hand allow the tracking module 355 to use inverse kinematics to determine a most likely pose of the user's hand based on the joint information. The pose data may also include an approximate structure of the user's hand, e.g., in the form of a skeleton, point mesh, or other format.

The neural network is trained using training data. In one embodiment, the training data is generated from a multiple camera array, such as multiple imaging devices 315, that captures hand movements in different poses with different hands from different users, and/or the locators on input devices worn by the different hands. The ground truth for this training data indicates joint positions and/or poses for the hands, and may be generated using human verification.

The gesture ID module 360 identifies the gestures of a user's hand based on the poses determined by the tracking module 355. The gesture ID module 360 may utilize a neural network to determine a gesture from a particular series of poses. Such a neural network may be trained using as input data computed poses (or joints) and with output data indicating the most likely gesture. Other methods may be used by the gesture ID module 360 to determine the gesture from the pose, such as a measurement of the distances and positions between the digits of the hand and the positions of a series of poses in 3D space. If these distances and positions of each pose fall within certain thresholds, the gesture ID module 360 may indicate that a particular gesture is present. In one embodiment, the gesture ID module 360 identifies a pinch gesture of the user. A pinch gesture is formed when distal ends of a user's index finger and thumb on one of the user's hands move within a threshold distance of each other. When the series of poses which form this gesture are recognized by the gesture ID module 360, the gesture ID module 360 determines that a pinch gesture is formed. As described in further detail below, the controller 310 may execute certain actions when this pinch gesture is detected along with other conditions, such as a particular gaze direction of the user's eyes as determined by the eye tracker 325.

Using such a method, the tracking module 355 is able to determine the likely poses of a user's hands, and with the determination of the poses, the gesture ID module 360 matches the movement of the user's hands with predefined gestures. These gestures may be used to indicate various actions in an artificial reality environment.

Additional details regarding the tracking and determination of hand positions using imaging devices and input devices are described in U.S. application Ser. No. 15/288,453, filed Oct. 7, 2016, and U.S. App. No. 62/401,090, filed Sep. 28, 2016, both of which are incorporated by reference in their entirety.

In another embodiment, the tracking module 355 is also configured to recognize objects in images captured by the imaging device 315. To perform this function, the tracking module 355 may first be trained on a large corpus of labeled object data, or be coupled to a pre-trained image recognition system, which may be on an online system. In the former case, the tracking module 355 includes a machine learning model (e.g., a convolutional neural network) and is trained on a standard image-object library (e.g., ImageNet), or on a large set of user-provided images from an online system. These user-provided images may include a large number of images of objects, as well as a labeling of these objects (e.g., using captions, etc.). Alternatively, in the latter case, the online system itself already includes a machine learning model trained on the aforementioned user-provided and labeled images. For example, the online system may already have an object recognition system which receives images and outputs a label for each. The model on the online system is used instead of any model on the controller 310 to perform the object recognition in this case. After recognizing an object, the tracking module 355 may be able to track the location of the object in the field of view provided by the NED 305 to the user. This may be achieved by continuously recognizing users in each frame captured by the imaging device 315. Once an object is recognized, the tracking module 355 can indicate the location of the object, and the boundaries of the object (e.g., the pixels corresponding to the recognized object) in the captured image. This can be translated to a location of the object in the user's field of view provided by the NED 305 through the optical assembly 310.

In one embodiment, the controller 310 additionally includes an execution engine 365. The execution engine 365 executes applications within the NED system 300 and receives position information, acceleration information, velocity information, predicted future positions, or some combination thereof, from the NED 305, input interface 345, and/or the tracking module 355. Based on the received information, the execution engine 365 determines content to provide to the NED 305 for presentation/display to the user. For example, if the received information indicates that the user has looked to the left, the execution engine 365 generates content for the NED 305 that is based off the user's movement in the artificial reality environment. Similarly, if information received from the tracking module 355 indicates the user's hand makes a particular gesture, the execution engine 365 generates content based on the identified gesture. In addition, if the information received from the NED 305 indicates a particular gaze of the user, the execution engine 365 may generate content based on that gaze. This content may include an update to the optical assembly 320 in the NED 305, such that content displayed to a user wearing the NED 305 changes.

The execution engine 365 may also perform an action within an application executing on the controller 310 in response to an action request received from the input interface 345 and provides feedback to the user that the action was performed. The provided feedback may be visual or audible feedback via the NED 305. For example, the execution engine 365 may receive an action from the input interface 345 to open an application, and in response, the execution engine 365 opens the application and presents content from the application to the user via the NED 305.

In addition to determining the current pose of the user's hand(s), the execution engine 365 may also provide output to the optical assembly 320 in accordance with a set of display instructions (e.g., pixel data, vector data, etc.). This output to the electronic display of the optical assembly 320 may include a virtual recreation (using computer graphics) of the user's hands, as well as other objects (virtual or otherwise), such as outlines of objects in the local area, text, graphics, other elements that coincide with objects within a field of view of a user wearing the NED 305, and so on.

The execution engine 365 may receive from the tracking module 355 an indication of a tracked object. The tracking module 355 may be previously configured to recognize and track certain objects. These objects may provide some control functionality or may be associated with additional details or information. Examples of such objects a described below with reference to FIGS. 5-10. Upon receiving the indication of the tracked object, the execution engine 365 transmits display instructions to the optical assembly 320 to cause the optical assembly 320 to display various elements, such as contextual menus, control user interface elements, informational menus, and so on, to the user. These displayed elements may be shown at a threshold distance from the tracked object as viewed by the user in the augmented or artificial reality environment presented by the NED 305.

In one embodiment, the execution engine 365 may first recognize the recognizable objects in a local area as captured by the imaging device 315. An object may be recognized according to a pre-programmed recognition pattern. A recognition pattern may include a unique identifier of the object as generated by the object recognition system of the tracking module 355. The recognition pattern may include the values of the output parameters generated by the object recognition system that caused the tracking module 355 to recognize the object (e.g., the confidence weights generated by the object recognition system). In another embodiment, the recognition pattern may be some other fingerprint, pattern, identifier, or other data that is able to be used to recognize the object again under different orientation and lighting. When the object is encountered, the object recognition system of the tracking module 355 may generate another identifier based on the characteristics of the object. This identifier is compared to the stored recognition pattern for the object, and if a match occurs, the object is recognized as the object associated with the stored recognition pattern.

Additionally, in some embodiments, the execution engine 365 further utilizes additional tracking indicators in the local area to assist in the recognition of objects. As noted above, the objects in the environment may have RF identifiers, which may be received by the input interface 345 via one or more RF receivers. The execution engine 365, via the signals received from the RF receivers, and through various signal source locating mechanisms (e.g., triangulation, time-of-flight, Doppler shift), may determine the position of an object that has an RF identifier using the RF signals from the object. This information may be used to augment (e.g., adjust for error) the image based object recognition system, or may be used in place of the image based object recognition system (e.g., in the case where the image based object recognition system fails or has high error/uncertainty). Other tracking indicators, such as retroreflectors (which may respond to a non-visible light signal from the eyewear device 100), high contrast locators, QR codes, barcodes, identifying image patterns, and so on, may also be used by the execution engine 365 to assist in recognizing the object, and this information may be stored in the recognition pattern for the object.

Upon recognition of the enhanced object, the execution engine 365 may update the display instructions of the optical assembly 320 to present additional simulated or virtual elements related to the enhanced object in the artificial reality environment presented by the NED system 300. The virtual elements may be positioned in the artificial reality environment at a threshold distance (e.g., 1 cm) of the enhanced object. The execution engine 365 may compute the position of the enhanced object in 3D space and project the virtual elements on the display such that they appear to be within the 3D space and near to the enhanced object (within the threshold distance). Upon detection of movement of the enhanced object, the execution engine 365 may submit updated display instructions to move the virtual elements based on the movement of the enhanced object.

In addition, the execution engine 365 receives from the tracking module 355 an indication of certain gestures, and in combination with receiving from the eye tracker 325 an eye-gaze direction of the user, may execute certain instructions related to one or more of the recognized objects. In one embodiment, the execution engine 365 receives from the eye tracker 325 an indication that the user's eye-gaze is towards a recognized object. The execution engine 365 also receives from the eye tracker 325 an indication that the user's eye-gaze is also through one of the user's hands. The execution engine 365 also receives an indication from the tracking module 355 that the user's hand for which the user's eye-gaze passes through is performing a particular gesture, such as pinch gesture (whereby a user's thumb an index finger move within a threshold distance of each other) or a throw gesture (e.g., a pinch gesture followed by a movement of the user's hand, followed by an exit of the pinch gesture). In such a scenario, the execution engine 365 may execute certain instructions related to the recognized object that is at the terminus of the user's eye-gaze, and may execute further instructions based on any additional gestures performed by the user, as indicated by the tracking module 355. In one embodiment, the instructions include retrieving information related to the recognized object from local storage or from a network. The information is composed into a display element by the execution engine 365, and the execution engine 365 transmits the instructions to display the display element to the optical assembly 320 to display the display element to the user. Additional examples of such gestures are described with further detail below with reference to FIGS. 4-11.

Although the description below is made primarily with reference to an artificial reality (e.g., an augmented reality) environment, the method described herein can also be applied to a virtual reality environment as well. In the virtual reality environment, the user wears a head mounted device that has an electronic display that does not allow light from the local area to strike the user's eyes. Instead, the user's view includes only what is displayed by the electronic display. In such a case, the eye gaze of the user may be towards a virtual object rather than an object in the local area, and the user may see a virtual representation of his or her hands in the virtual reality environment instead of his or her actual hands.

Long Distance Gestures with Gaze Tracking in Artificial Reality

The following figures illustrate various gestures combined with gaze tracking to enable precise long distance manipulation and operation of objects within a local area or area. The local area includes the real physical environment surrounding a user that is wearing the NED 305, and may include any visible environment surrounding the user. The gestures and user gaze information may be detected by the NED system 300 described in FIG. 3.

In particular, the following figures describe a system that detects the intersection of a user's gaze with the user's hand as it performs various gestures. Such a system can allow for more precise targeting and manipulation of objects in the local area in comparison to a traditional system that does not determine the intersection of the user's hand and gaze. For example, a traditional system may determine that a user intends to focus on a particular object in the local area, and perform an action related to such focus, while the user is in fact not intending such focus. As another example, a traditional system may incorrectly determine that a user's gaze is on a particular object, but due to measurement error or due to the fact that the system may in some cases only track the gaze of one of the user's eyes, the system may once again incorrectly determine the object of focus for the user.

In the following description, the term vertical indicates an axis that is substantially parallel (within a threshold degree) to a gravity vector (i.e., a vector matching the direction of gravity). The term up indicates a direction along the vertical axis that is most opposed to the direction of gravity, and the term down indicates a direction along the vertical axis that is opposite the direction of the up direction. The term horizontal indicates an axis that is substantially orthogonal (to a threshold degree) to the vertical axis. The term right indicates a direction along this horizontal axis, and is substantially (i.e., within a threshold range of) 90 degrees clockwise from the up direction. The term left indicates a direction on the horizontal axis that is opposite the direction indicated by the right direction.

Figure 4:
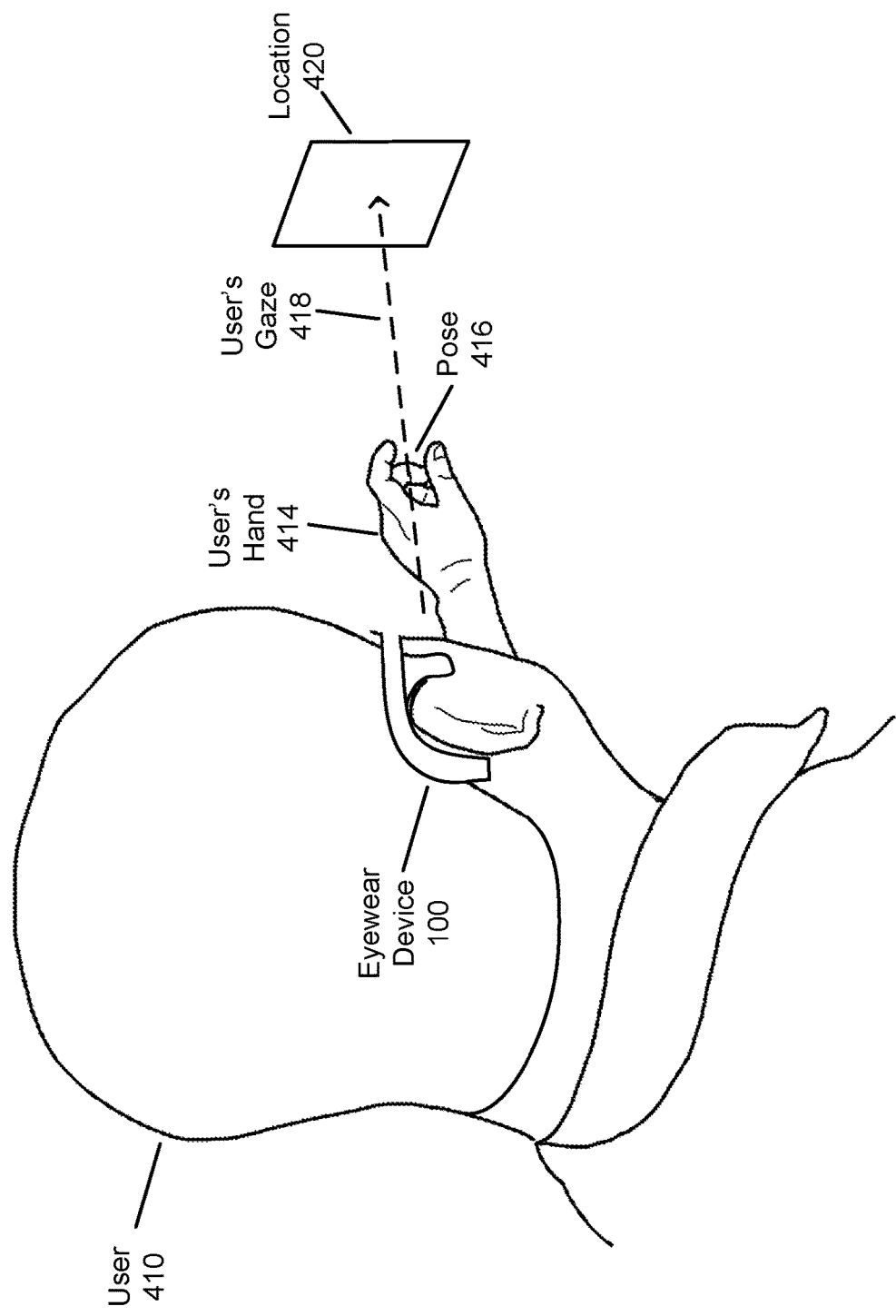
FIG. 4 illustrates an example of the detection by the NED system of the intersection between a user's gaze and the user's hand of a user, in accordance with one or more embodiments.

FIG. 4 illustrates an example of the detection by the NED system 300 of the intersection between a user's gaze and the user's hand of a user, in accordance with one or more embodiments. In FIG. 4, a user 410 is wearing the eyewear device 100 described in FIG. 1 and which includes the functionality of the NED 305 and some or all of the NED system 300 as described in FIG. 3. A user's hand 414 is outstretched in front of the user with a particular pose 416. A user's gaze 418 is towards a location 420 (represented by a rectangular shape). After the controller 310 of the NED system 300 detects that the user's hand 414 moves within a threshold distance of a line formed by the user's gaze 418 as shown, the controller 310 may transmit updates to an electronic display of the optical assembly 320 of the NED 305 with additional display instructions in response to the detection. Alternatively, this update is sent in response to the controller 310 detecting an intersection of the user's gaze 418 with a point between the distal ends of two of the user's fingers (e.g., the index finger and thumb), where the user has performed a particular gesture with his or her hand 414. The controller 310 may also send instructions to an object located at the terminus of the user's gaze 418, i.e., location 420. The terminus of the user's gaze 418 is the point at which a ray of visible light in the starting position and direction of the user's gaze is blocked by an object in the environment. In the descriptions of FIG. 5-11 below, the orientation of the user's head 410, hand 414, and gaze 416 are similar to that described here with reference to FIG. 4.

Figure 5A:
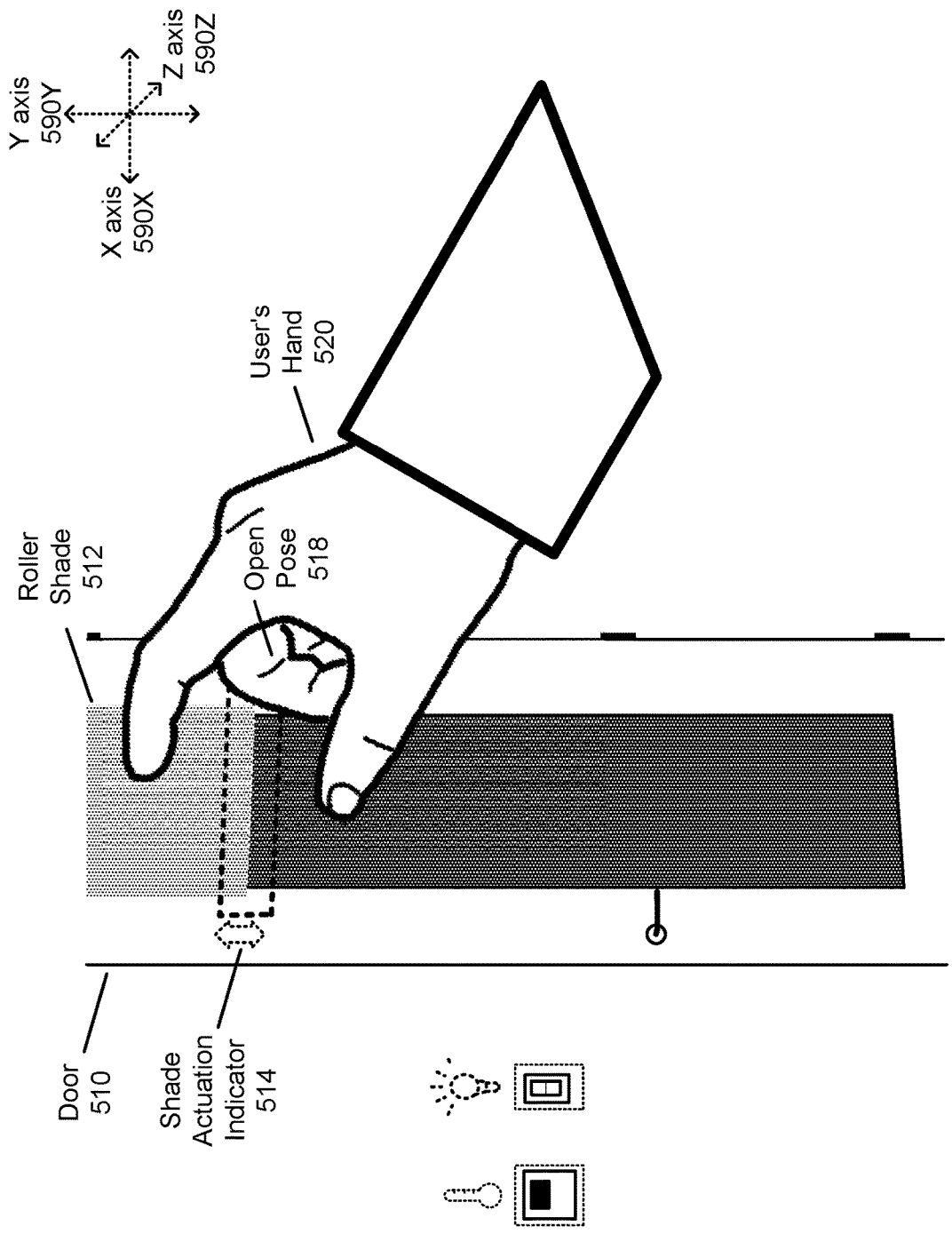
FIG. 5A illustrates an exemplary NED filter display applied to a NED for actuating a physical control in a local area, in accordance with one or more embodiments.

FIG. 5A illustrates an exemplary NED filter display applied to the NED 305 for actuating a physical control in a local area, in accordance with one or more embodiments. In contrast to the third party overview perspective of FIG. 4, the perspectives shown in FIGS. 5A-10D is that of a view as seen through the NED 305, and thus includes any NED filter display generated using display instructions sent by the controller 310 to the electronic display of the optical assembly 320, combined with views of the local area as passed through the optical assembly 320 to the user of the NED. The views of the local area include the field of view of the wearer, based on the user's gaze. Thus, for example, in FIG. 5A, a user's gaze is towards a door 510, and thus the perspective shown by FIG. 5A is towards the door.

The view shown in FIG. 5A depicts various objects in the local area, as well as an image overlay (or NED filter display) provided by the NED 305 in the artificial reality environment. In this embodiment, the artificial reality environment is a combination of real, non-virtual, objects in the local area overlaid by additional content (e.g., images) by the NED 305 as seen by a user wearing an eyewear device that includes the NED 305, such as the eyewear device 100.

FIG. 5A further shows a user's hand 520 in an open pose 518. The open pose 518 shown here is where the distal ends of the user's index finger and thumb are at a distance exceeding a threshold value (e.g., 3 cm). This open pose is one of a series of poses, including a subsequent closed pose, that forms a pinch gesture, as described below.

The user's hand 520 is in front of the door 510 from the perspective of the illustrated scene. This particular door 510 also includes a roller shade 512. The artificial reality environment presented by the NED 305 further overlays a shade actuation indicator 514 near (e.g., within a distance of) the area of the bottom edge of the roller shade 512. Indicators may be of a different color, shading, lighting effect, than the surrounding objects to indicate that it may be interacted with by the user. Indicators may be shaped as an outline of the object that is to be indicated. Such shapes may include circles, rectangles, start shapes, etc. The shade actuation indicator 514 may further include a directional arrow to indicate a direction of movement for the shade actuation indicator 514. When the user interacts with this shade actuation indicator 514 as described below with reference to FIGS. 5B-5C, the controller 310 detects this interaction and actuates the roller shade 512, which is mechanized and communicatively coupled, e.g., via a wireless interface, to the controller 310. The actuation may be based upon a detection by the controller 310 of a particular movement of the user's hand or based on some gesture of the user's hand.

Figure 5B:
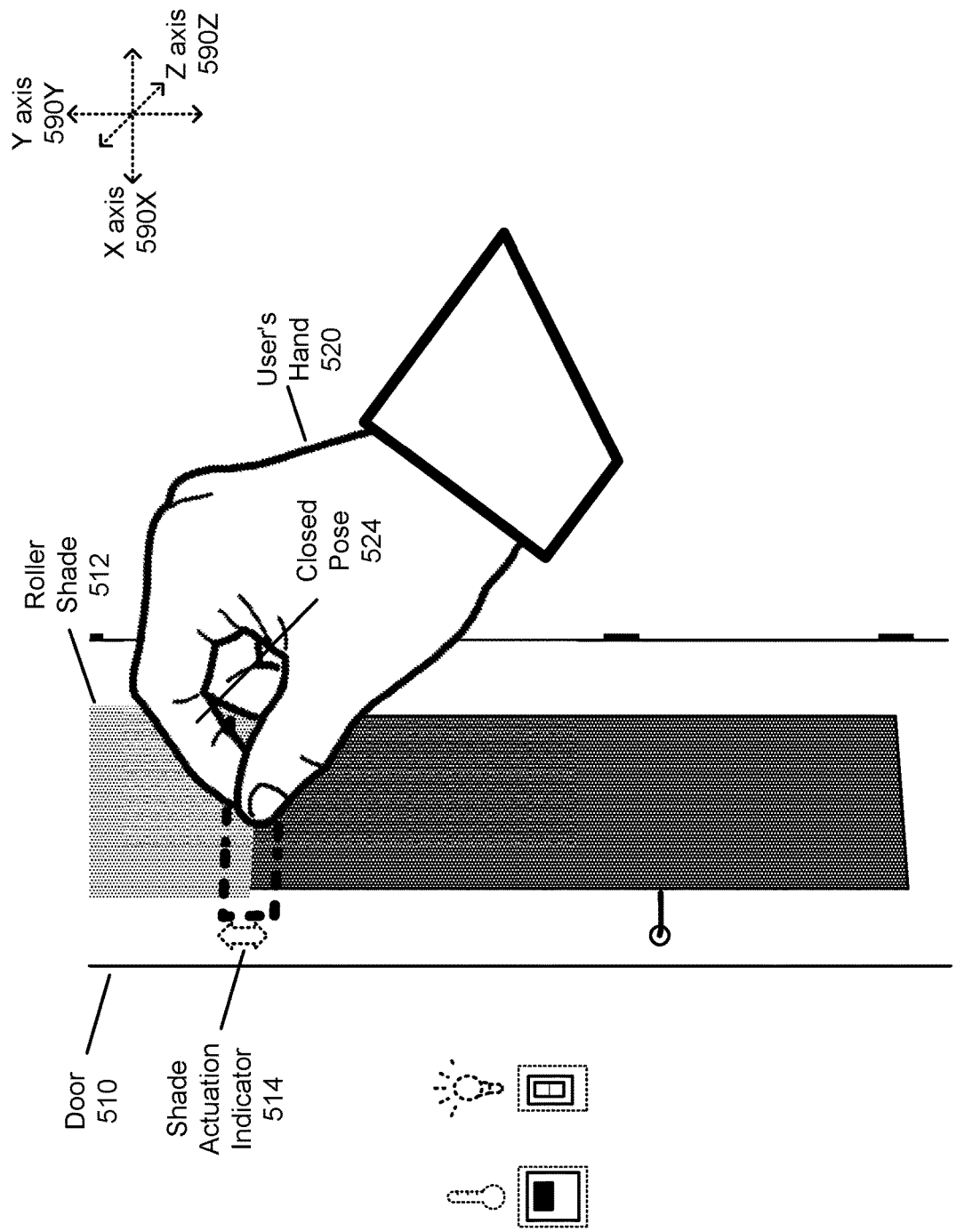
FIG. 5B illustrates an exemplary NED filter display applied to the NED of FIG. 5A during the actuation of the physical control in the local area, in accordance with one or more embodiments.

FIG. 5B illustrates the exemplary NED filter display applied to the NED 305 of FIG. 5A during the actuation of the physical control in the local area, in accordance with one or more embodiments. In FIG. 5B, the user's hand 520 is now in a closed pose 524, where the distal ends of the user's thumb and index finger are within a threshold distance of each other. This change in pose from the open pose 518 is detected as a pinch gesture by the controller 310. The controller 310 further determines whether the user's gaze intersects with a point between the distal ends of the user's thumb and index finger. The gaze orientation is an imaginary ray between an object and a foveal region of the user's eye. In this case, the object is the point between the distal ends of the user's thumb and index finger.

Upon detecting both the pinch gesture and the intersection of the user's gaze to be between the distal ends of the user's index finger and thumb, the controller 310 identifies an object that is at the terminus of the user's gaze. The terminus of the user's gaze, as described above, is the endpoint of the user's gaze, where it is blocked by an object that is not substantially transparent to visible light.

In the example of FIG. 5B, the object is the bottom edge of the roller shade 512. Upon identification of this bottom edge of the roller shade 512, the controller 310 sends instructions to the optical assembly 320 of the NED 305 to change the shade actuation indicator 514 to indicate the activation of the roller shade 512 control. This change to the indicator may be a change in shape, color, lighting, the addition of displayed text, and any other change that may draw a user's attention. In the illustrated example, the change is indicated by a thicker weight to the outline representing the shade actuation indicator 514. In another embodiment, the shade actuation indicator 514 may be represented as an internally lit colored outline, and the change is an increase in intensity (e.g., the intensity of the lighting of the outline increases).

Figure 5C:
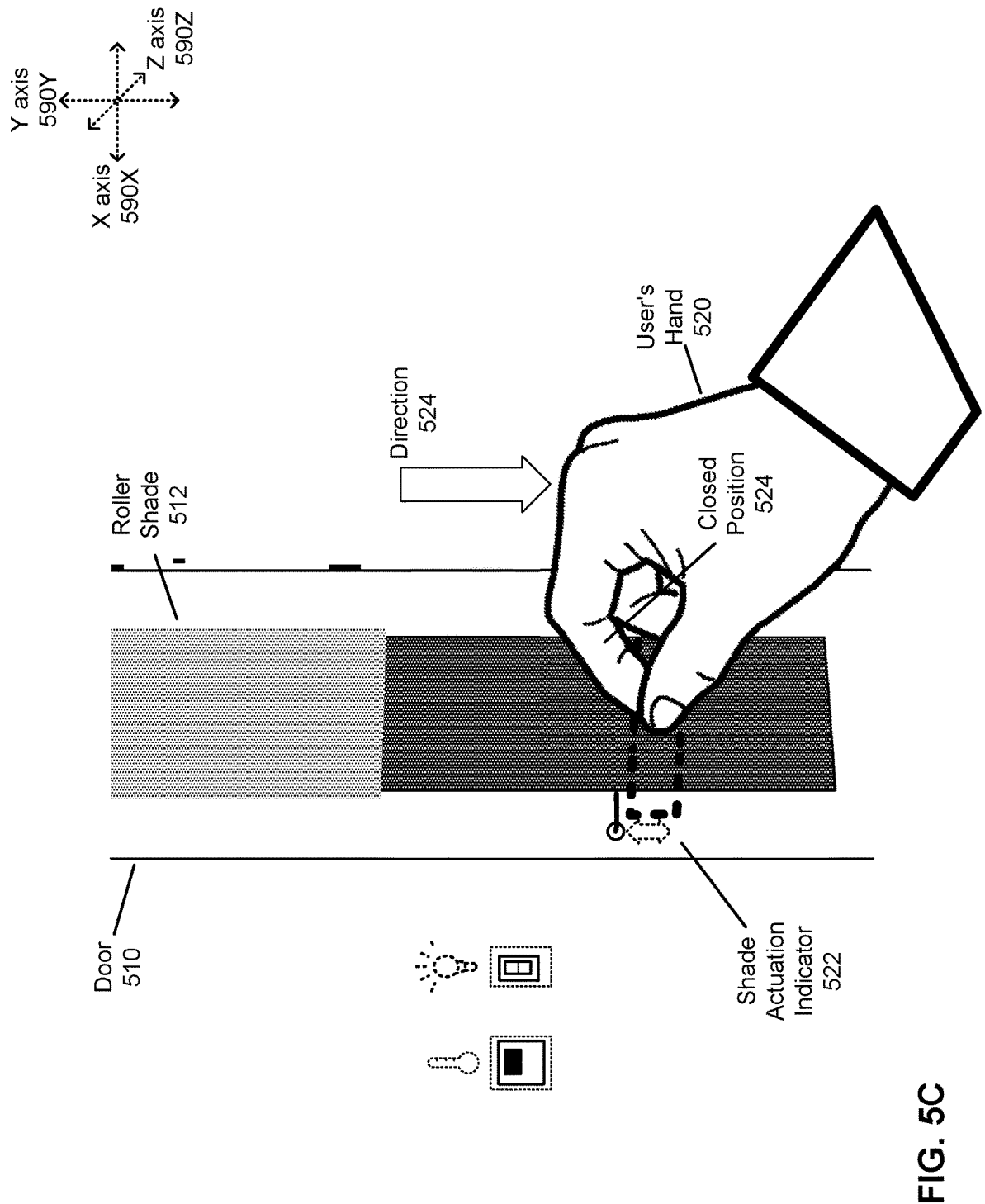
FIG. 5C illustrates an exemplary NED filter display applied to the NED of FIG. 5B for completing the actuation of the physical control in the local area, in accordance with one or more embodiments.

FIG. 5C illustrates the exemplary NED filter display applied to the NED 305 of FIG. 5B for completing the actuation of the physical control in the local area, in accordance with one or more embodiments. Following from FIG. 5B, in FIG. 5C, the user's hand 520 is moved down along the Y axis 590Y in the direction 526 while still maintaining the pinch gesture (i.e., the closed pose 524). The movement of the user's hand 520 along the Y axis 590Y is also known as a vertical movement gesture. This vertical movement gesture or change in direction of the user's hand is detected by the controller 310 and in response, the controller 310 sends instructions to the roller shade 512 to actuate it in the down direction indicated by the direction 526, causing the bottom edge of the roller shade 512 to move down and cover the window pane of the door 510. The controller 310 may instruct the roller shade 512 to move the bottom edge of the roller shade 512 to a position matching the position of the user's hand 520 as projected onto the door 510 in the artificial reality environment.

The controller 310 may also send instructions to the optical assembly 320 to move the display of the shade actuation indicator 522 such that it is still at the same X and Z axis (590X and 590Z) position as it originally was at, but a new Y axis (590Y) position that is near to the position of the user's hand 520 as projected onto the door 510 in the artificial reality environment.

The adjustments made above to the roller shade 512 and to the shade actuation indicator 522 may be continuous along with the motion of the user's hand. However, at some point, the controller 310 may detect that the user has exited the pinch gesture. This occurs after the user's hand 520 returns to the open pose 518. Alternatively, in some embodiments, this occurs after a distance between the distal ends of the user's index finger and thumb exceeds a threshold distance. At this point, the controller 310 may make a final adjustment to the roller shade 512 and the shade actuation indicator 522 such that they are in a final position corresponding to the last position of the user's hand 520 before the user's hand exited the pinch gesture. To determine this final position, the controller 310 may translate the last position of the user's hand before the hand exited the pinch gesture as projected onto the roller shade 512 in 3D space, and determine this projected position to be the final position of the roller shade 512.

Although the above example describes the controller 310 detecting both a pinch gesture and the intersection of the user's gaze to be between the distal ends of the user's index finger and thumb, in other embodiments the controller 310 does not detect the user's gaze in order to identify the object (e.g., roller shade 512 in FIG. 5A-C) but instead by drawing an imaginary ray from a point on the user's pupil through a point between the distal ends of the user's index finger and thumb and continuing until the imaginary ray reaches the object. Furthermore, although the description below is made with regards to determining both a pinch gesture and the user's gaze, the second method described here (i.e., drawing the imaginary ray) can also be used in substitution for the determination of the user's gaze for the examples described below.

Figure 6A:
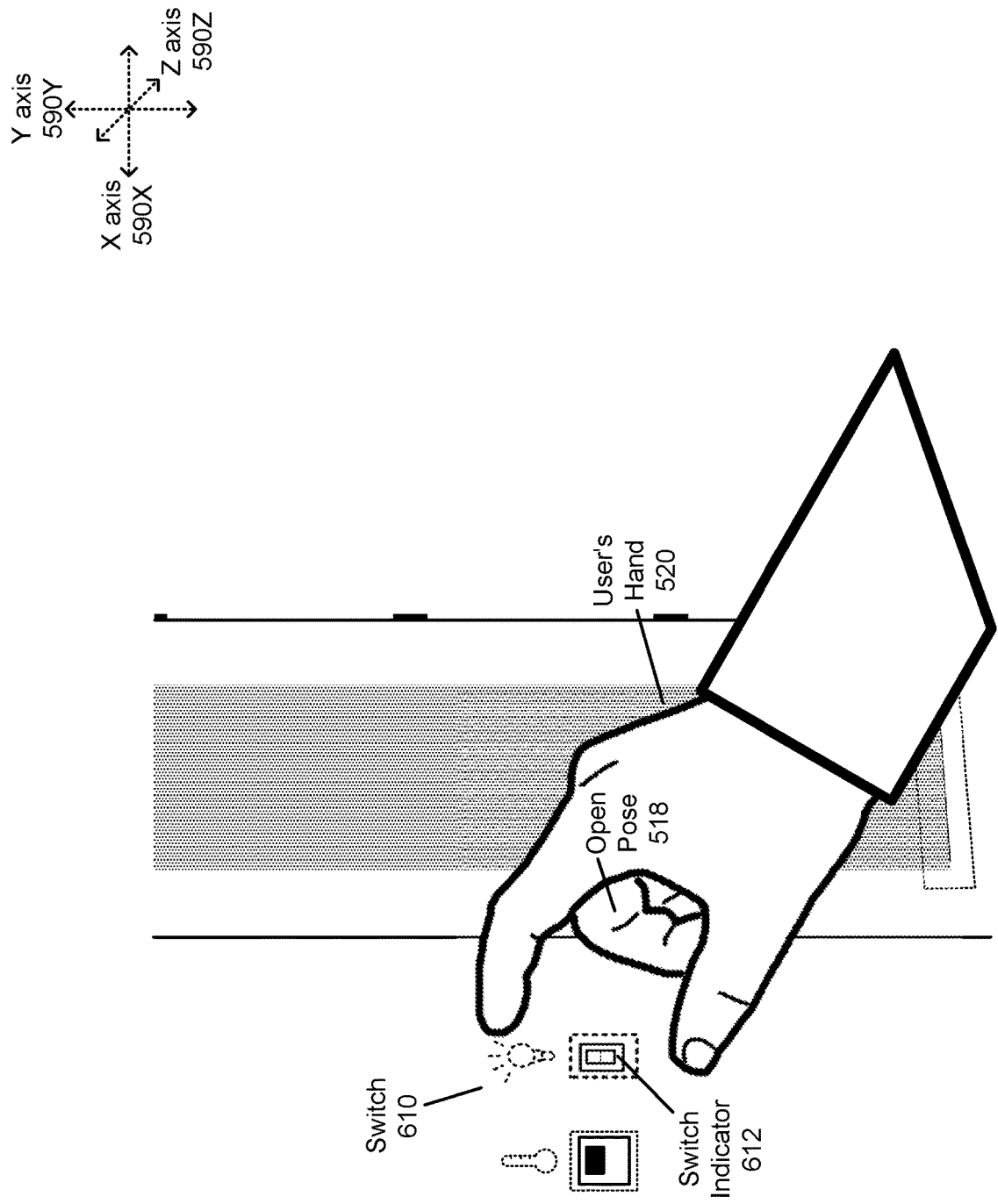
FIG. 6A illustrates an exemplary NED filter display applied to a NED for the actuation of a switch control in a local area, in accordance with one or more embodiments.

FIG. 6A illustrates an exemplary NED filter display applied to the NED 305 for an actuation of a switch control in a local area, in accordance with one or more embodiments.

In FIG. 6A, the user's hand 520 is in an open pose 518. Additionally, the user's gaze passes within a threshold distance of the user's hand and terminates at the switch 610. The controller 310 also has instructed the optical assembly 320 to display a switch indicator 612 in the artificial reality environment, depicted here as a stylized light bulb with emanating rays, along with an outline surrounding the position of the switch in the artificial reality environment. The switch indicator 612 may be displayed below a threshold distance from the switch 610 itself in the AR environment.

Figure 6B:
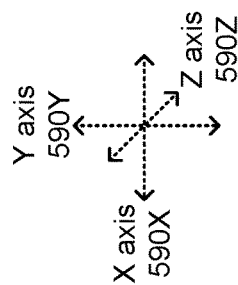
FIG. 6B illustrates the exemplary NED filter display applied to the NED of FIG. 6A during the actuation of the physical control in the local area, in accordance with one or more embodiments.
Figure 6B:
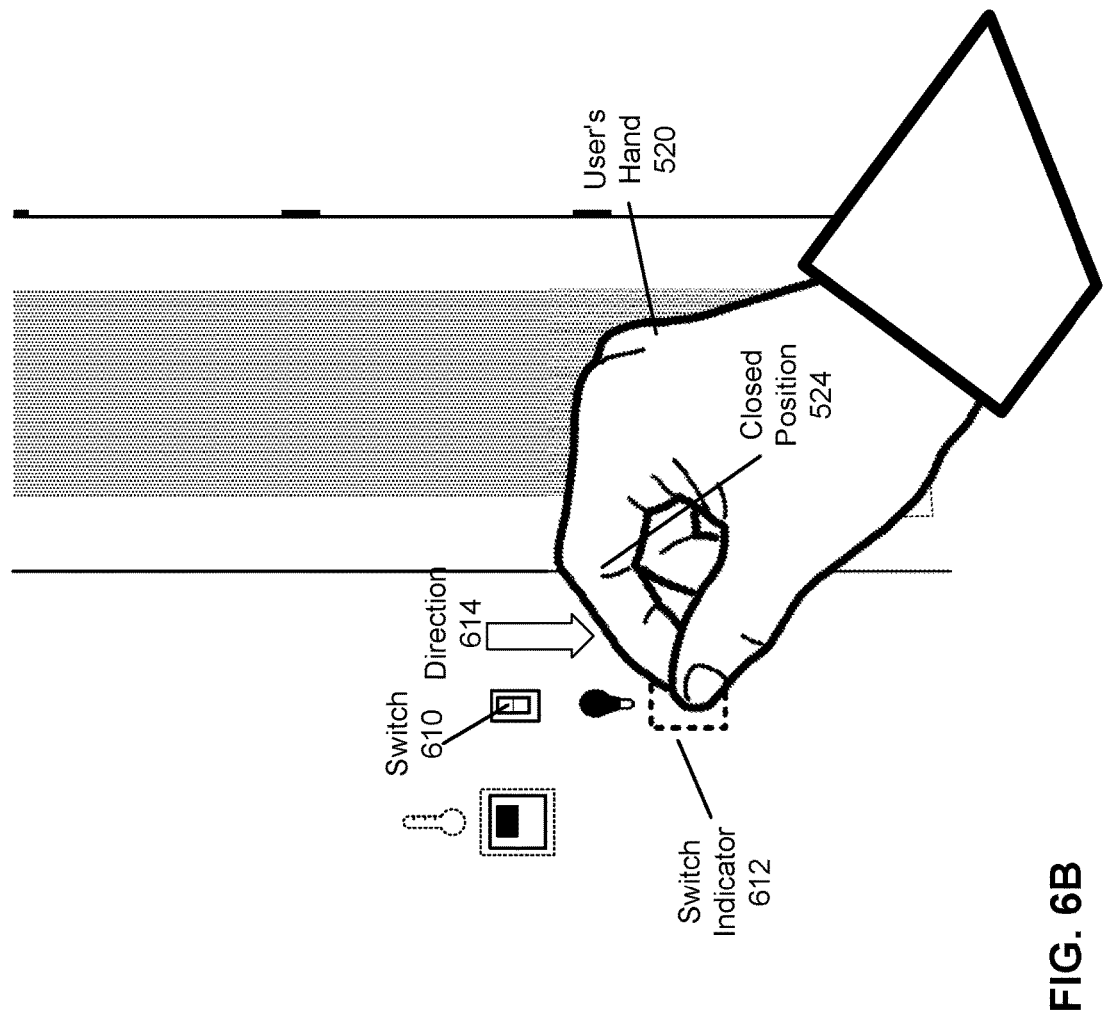

FIG. 6B illustrates the exemplary NED filter display applied to the NED 305 of FIG. 6A during the actuation of the physical control in the local area, in accordance with one or more embodiments. In FIG. 6B, the user's hand 520 has completed a pinch gesture and is in a closed pose 524 (the pinch gesture is described previously). Subsequently, the user's hand also moves downwards in the direction 614.

Prior to the downwards movement of the user's hand, the controller 310 detected that the user's gaze intersects with the user's hand (between the distal ends of the user's index finger and thumb) and further terminates at the switch 610. Furthermore, the controller 310 detected that the user's hand 520 completes a pinch gesture. This may cause the controller 310 to update the optical assembly 320 with display instructions to change the switch indicator 612. This change may be similar to the change made to the shade actuation indicator 514 (e.g., increasing the intensity of the indicator).

In addition, the controller 310 may update the displayed switch indicator 612 while the user's hand 520 is moving in the downwards direction 614 substantially along the Y axis (590Y). The controller 310 may instruct the optical assembly 320 to move the display of the switch indicator 612 to a position that is within a threshold distance of the user's hand as projected onto the plane of the switch indicator 612 in 3D before the movement of the switch indicator 610. In the illustration of FIG. 6B, this plane is fixed along the Z axis (590Z) and is parallel to the X and Y axes (590X and 590Y).

After the user's hand 520 is moved in the downwards direction 614 along the Y axis 590Y past a threshold distance from the original position of the user's hand 520 at the point where the pinch gesture was formed, the controller 310 may further transmit instructions to the object that was the terminus of the user's gaze, or another device or element related to this object, in order to instruct the object to cause a change based on the movement direction of the user's hand 520. In this case, the object is the switch 610, and thus the controller 310 sends instructions to this switch or a device related to the switch 610 (e.g., a light bulb). The instructions sent depend upon the direction of the movement of the user's hand 520. In this case, a downwards direction of the user's hand 520 indicates an instruction to turn off the light associated with the switch 610. Thus, the controller 310 transmits instructions to the switch 610 or to a light bulb associated with the switch 610 to turn off the light.

Furthermore, at this point, the controller 310 may also transmit instructions to the optical assembly 320 to change the display of the switch indicator 612 to indicate the change in state of the object due to the instructions being sent to the object. Here, the change in state caused the light bulb to be turned off, and thus the switch indicator 612 may be updated to indicate that the light is off, illustrated here by a stylized darkened light bulb.

Additionally, the controller 310 may subsequently detect that the user has exited the pinch gesture by having the user's hand return to the open pose 518. At this point, the controller 310 may update the optical assembly 320 to cause the optical assembly 320 to display the switch indicator 612 back at its original position at the switch 610 in the artificial reality environment.

Finally, the user may alternatively perform a pinch gesture against the switch 610, while gazing at the switch, and subsequently move his or her hand in an upwards direction, opposite to the downwards direction 614. Upon detection of this by the controller 310, the controller 310 can send different instructions to the switch or device associated with the switch 610 to turn the light on (if it was not on already), and to update the displayed switch indicator 612 to indicate this change.

Figure 7A:
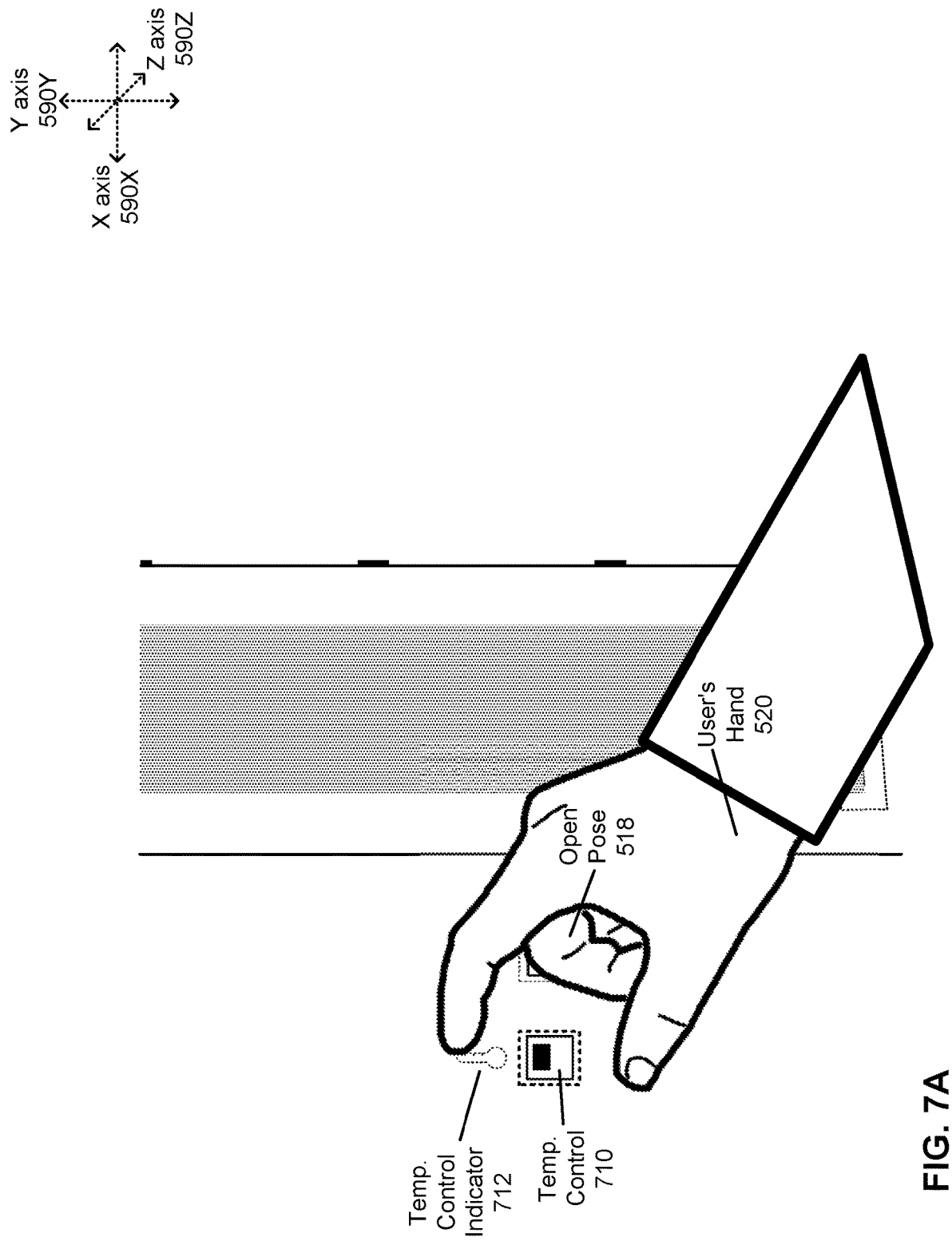
FIG. 7A illustrates an exemplary NED filter display applied to a NED for the adjustment of a variable control in a local area, in accordance with one or more embodiments.

FIG. 7A illustrates an exemplary NED filter display applied to a NED 305 for the adjustment of a variable control in a local area, in accordance with one or more embodiments. In FIG. 7A, the user's hand 520 is in an open pose 518. Additionally, the user's gaze intersects with the user's hand and terminates at a temperature control 710. Although a particular object is illustrated as a temperature control 710, in other embodiments it could be any type of control element that allows for a range of variable options to be selected. The controller 310 also has instructed the optical assembly 320 to display a temperature control indicator 712 in the artificial reality environment, depicted here as a stylized thermometer, along with an outline surrounding the position of the temperature control 710 in the artificial reality environment. The temperature control indicator 712 may be displayed below a threshold distance from the temperature control 710 itself in the artificial reality environment (i.e., near the temperature control). In the case of another type of control element with a range of variable options, different control indicator would be shown representing the range of variable options for that control element. In addition, a virtual indicator indicating the current temperature setting could be displayed at a threshold distance to the temperature control 710 in the artificial reality environment.

Figure 7B:
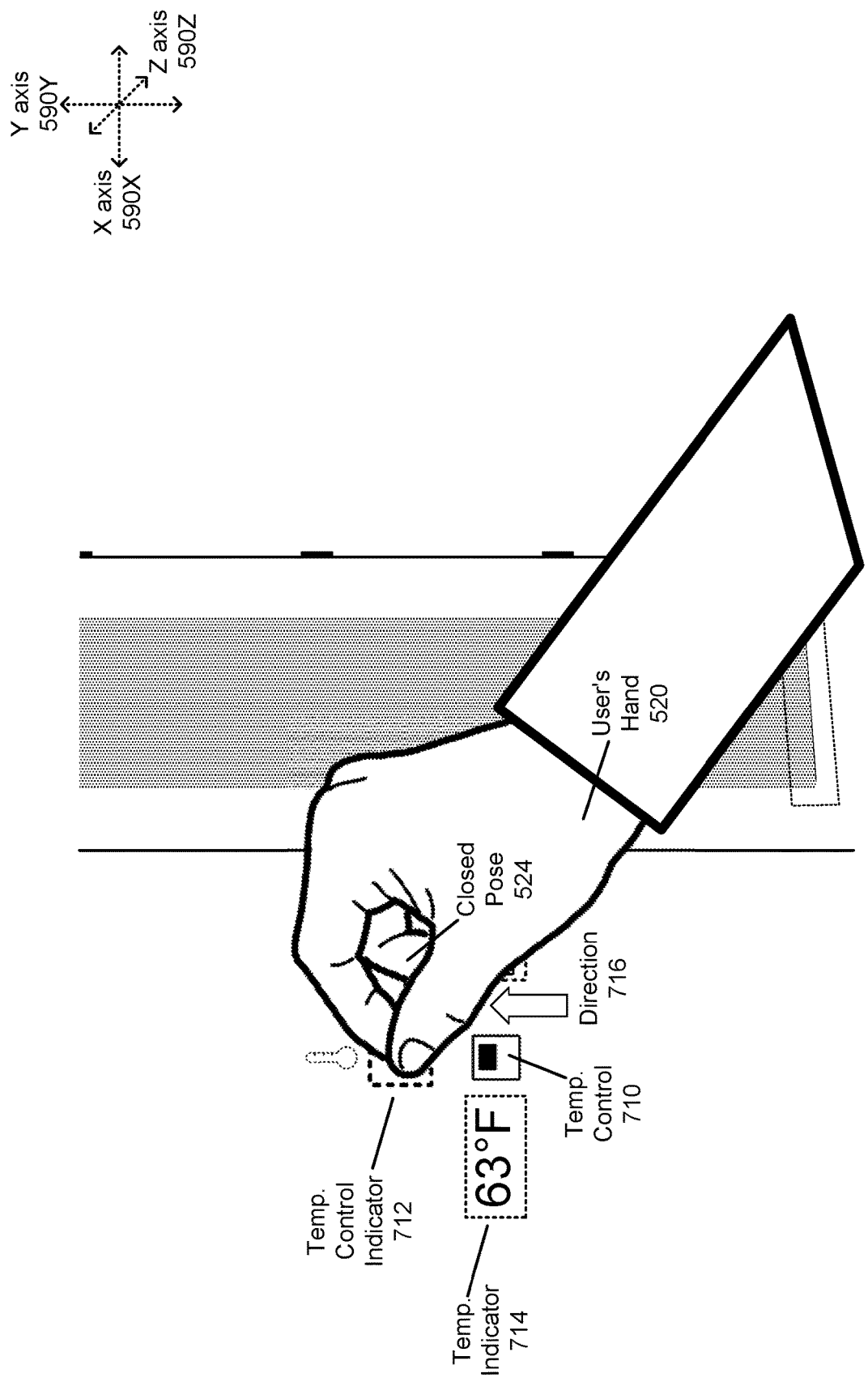
FIG. 7B illustrates the exemplary NED filter display applied to the NED of FIG. 7A during the adjustment of the variable control in the local area, in accordance with one or more embodiments.

FIG. 7B illustrates the exemplary NED filter display applied to the NED 305 of FIG. 7A during the adjustment of the variable control in the local area, in accordance with one or more embodiments. In FIG. 7B, the user's hand 520 has completed a pinch gesture and is in a closed pose 524 (the pinch gesture is described previously). Subsequently, the user's hand also moves upwards in the direction 716 along the Y axis (590Y).

Before the user's hand 520 is moved upwards, the controller 310 detects that the user's gaze intersects with the user's hand (between the distal ends of the user's index finger and thumb) and further terminates at the temperature control 710. Furthermore, the controller 310 detects that the user's hand 520 completes a pinch gesture. This may cause the controller 310 to update the optical assembly 320 with display instructions to change the temperature control indicator 712. This change may be similar to the change made to the shade actuation indicator 514 (e.g., increasing the intensity of the indicator).

In addition, the controller 310 may update the displayed temperature control indicator 712 while the user's hand 520 is moving in the upwards direction 716 substantially along the Y axis 590Y. The controller 310 may instruct the optical assembly 320 to move the temperature control indicator 712 along with the user's hand. The controller 310 may instruct the optical assembly 320 to move the display of the temperature control indicator 712 to a position that is within a threshold distance of the user's hand as projected onto the plane of the temperature control indicator 712 in the artificial reality environment before the movement of the temperature control indicator 712. In the illustration of FIG. 7B, this plane is fixed along the Z axis 590Z and is roughly parallel to the X and Y axes (590X and 590Y).

After the user's hand 520 is moved in the upwards direction 716 past a threshold distance from the original position of the user's hand 520 at the point where the pinch gesture was formed, the controller 310 may further transmit instructions to the object that was the terminus of the user's gaze, or another device or element related to this object, in order to instruct the object to cause a change based on the movement direction of the user's hand 520. In this case, the object is the temperature control 710, and thus the controller 310 sends instructions to this temperature control 710 or a device related to the temperature control 710 (e.g., an air conditioning unit). The instructions sent depend upon the direction of the movement of the user's hand 520. In this case, an upwards direction of the user's hand 520 indicates an instruction to increase the temperature set point of the temperature control 710. Thus, the controller 310 sends instructions to the temperature control 710 to increase the temperature set point.

As the temperature control 710 can set a temperature at a variety of different values, the increase in the temperature set point that is instructed by the controller 310 may depend upon the duration at which the user's hand 520 remains in the pinch gesture and also remains beyond the threshold distance from the original position at which the pinch gesture was formed. For example, the controller 310 may instruct the temperature control 710 to increase the temperature set point in proportion to the duration at which the user's hand 520 remains in the aforementioned position. Furthermore, the increase in the temperature set point may also or alternatively depend upon the distance that the user's hand 520 is moved. For example, the controller 310 may instruct the temperature control 710 to increase the temperature set point in proportion to the distance at which the user's hand 520 moves from the original position at which the user formed the pinch gesture. Such a variable control based on duration and/or distance of the user's hand can apply to any type of similar control options that provide a variable output or response, and is not limited to temperature control.

Furthermore, at this point, the controller 310 may also transmit instructions to the optical assembly 320 to indicate the change made to the temperature control 710. Instead of changing the temperature control indicator 712, the instructions may cause the optical assembly 320 to display a temperature indicator 714 indicating an updated numerical temperature set point. The controller 310 sends updated instructions to the optical assembly 320 as the temperature set point is changed to update the temperature indicator 714 accordingly.

Additionally, the controller 310 may subsequently detect that the user has exited the pinch gesture by having the user's hand return to the open pose 518. At this point, the controller 310 may update the optical assembly 320 to cause the optical assembly 320 to display the temperature control indicator 712 back at its original position in the artificial reality environment.

Figure 7C:
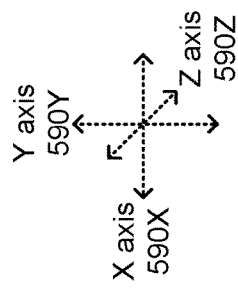
FIG. 7C illustrates the exemplary NED filter display applied to the NED of FIG. 7B for an alternative adjustment of the variable control in the local area in accordance with one or more embodiments.
Figure 7C:
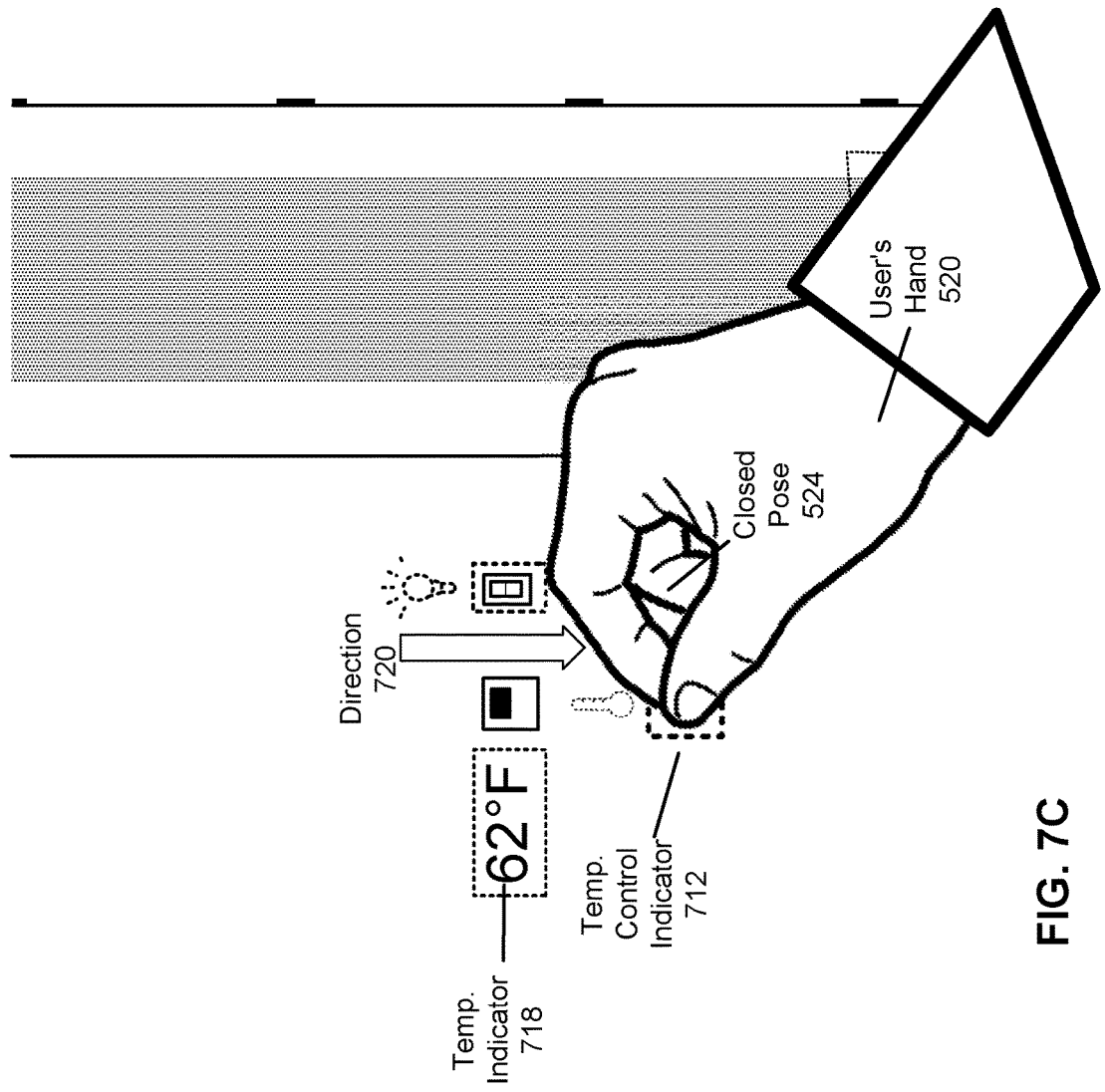

FIG. 7C illustrates the exemplary NED filter display applied to the NED 305 of FIG. 7B for an alternative adjustment of the variable control in the local area, in accordance with one or more embodiments. In FIG. 7C, the pinch gesture and gaze made by the user are the same as in FIG. 7B, however instead of moving in the upwards direction, the user's hand moves in a downwards direction 720 along the Y axis 590Y. Thus, the instruction sent by the controller 310 to the temperature control 710 (or related device) is to decrease the temperature set point. Similarly, a different temperature indicator 718 is displayed indicating the decrease in the temperature set point. As with the upwards direction, the amount of change of the temperature set point and/or the rate of change may depend upon the distance moved by the user's hand and the duration held by the user's hand in the moved position.

Figure 8A:
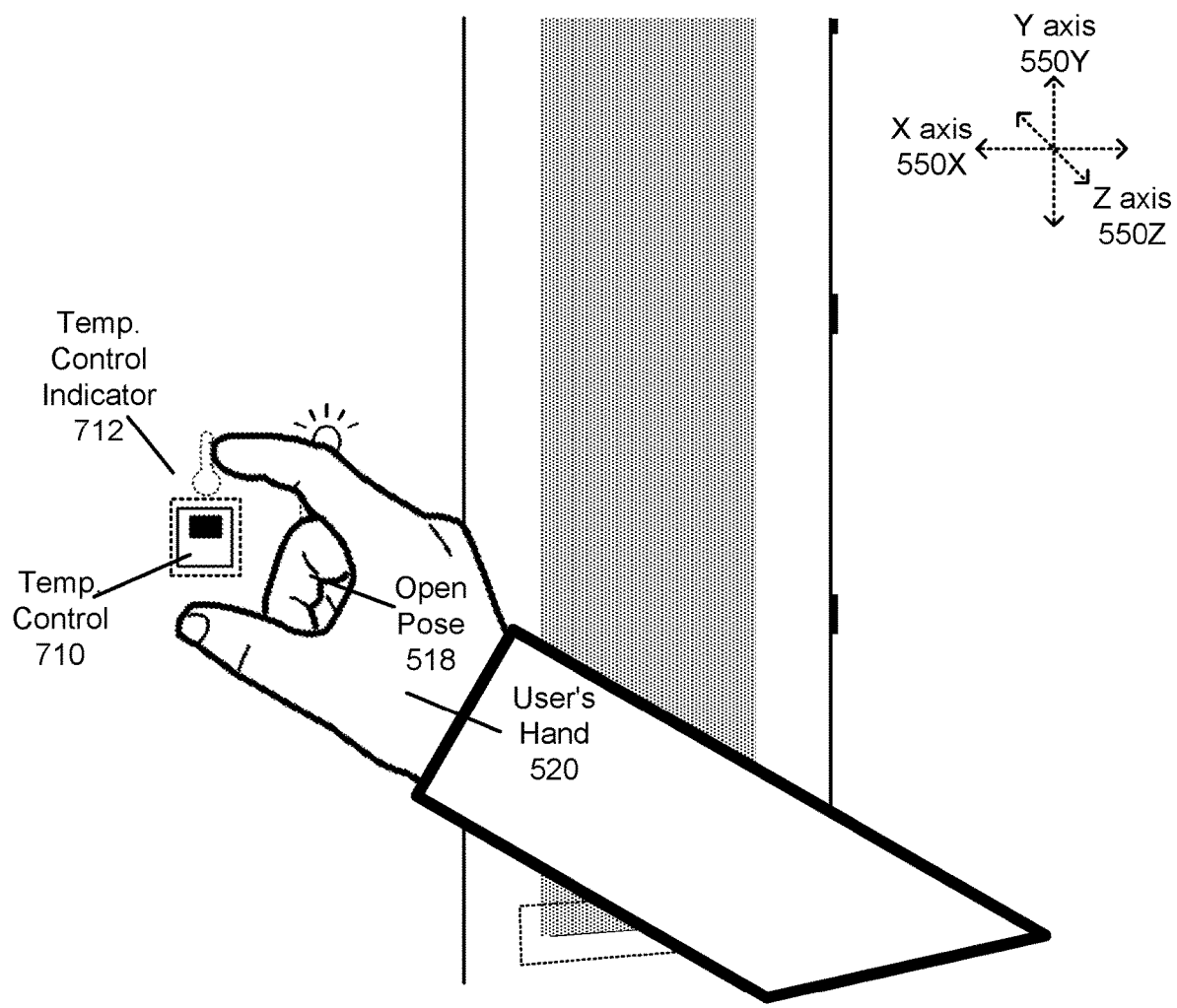
FIG. 8A illustrates an exemplary NED filter display applied to a NED for an interaction with a contextual menu using a pinch gesture, in accordance with one or more embodiments.

FIG. 8A illustrates an exemplary NED filter display applied to the NED 305 for an interaction with a contextual menu using a pinch gesture, in accordance with one or more embodiments. In FIG. 8A, the user's hand 520 is in an open pose 518. Additionally, the user's gaze passes within a threshold distance of the user's hand and terminates at the temperature control 710. Although the particular object at which the user's gaze terminates is a temperature control 710, in other embodiments it could be any other type of control element. The controller 310 also has instructed the optical assembly 320 to display the temperature control indicator 712 in the artificial reality environment.

Figure 8B:
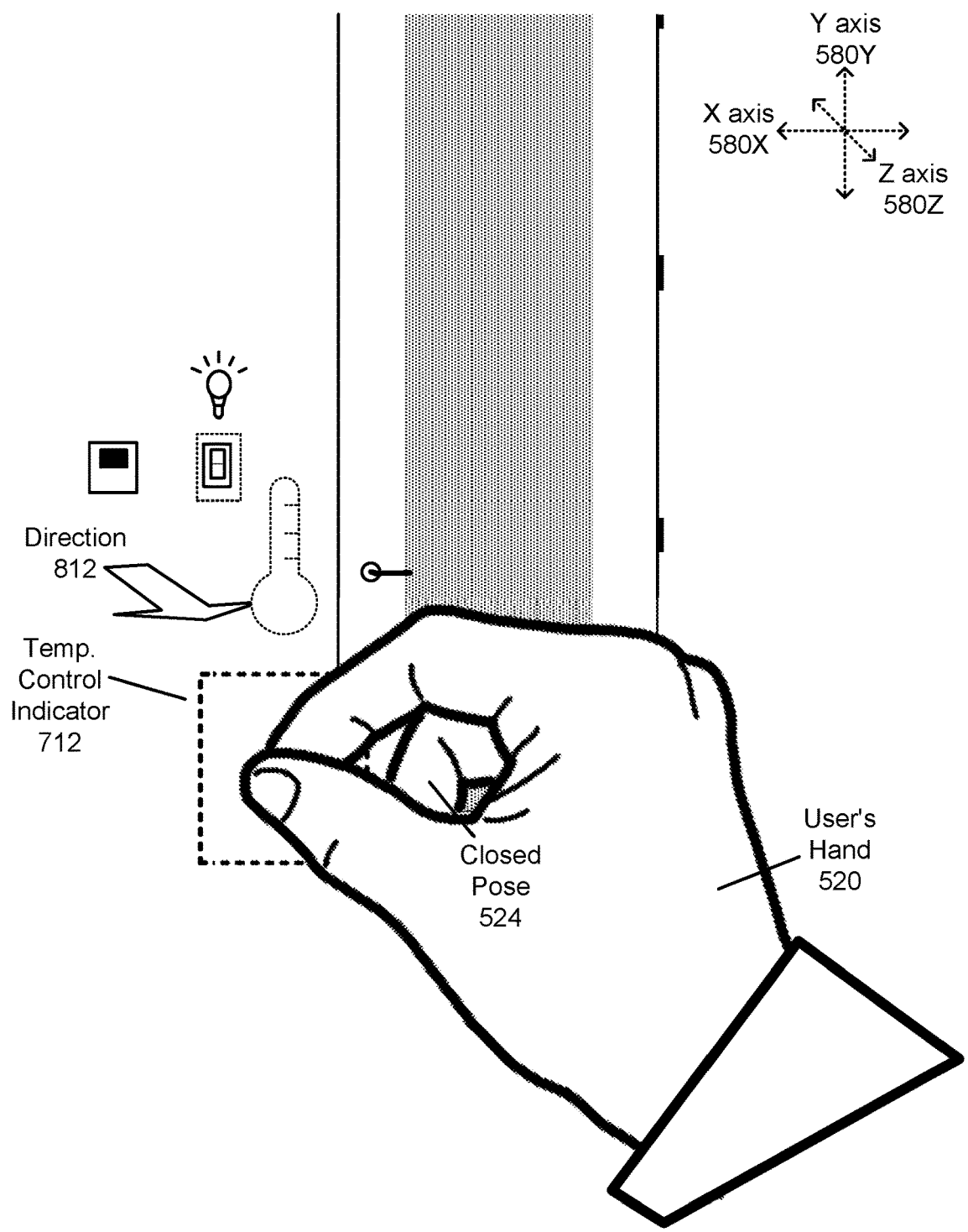
FIG. 8B illustrates an exemplary NED filter display applied to the NED of FIG. 8A during the pinch motion for the interaction with the contextual menu using the pinch gesture, in accordance with one or more embodiments.

FIG. 8B illustrates the exemplary NED filter display applied to the NED 305 of FIG. 8A during the pinch motion for the interaction with a contextual menu using the pinch gesture, in accordance with one or more embodiments. In FIG. 8B, the user's hand 520 has completed a pinch gesture and is in a closed pose 524 (the pinch gesture is described previously). Subsequently, the controller 310 detects that the user's hand also moves outwards in the direction 812 substantially along the Z axis (590Z). This direction 812 may be towards the user (e.g., the user pulls her hand back towards her body). This combination of a pinch gesture and an outwards motion may be known as a push-pull gesture.

Before the user's hand 520 is moved outwards, the controller 310 detects that the user's gaze intersects with the user's hand (between the distal ends of the user's index finger and thumb) and further terminates at the temperature control 710. Furthermore, the controller 310 detects that the user's hand 520 completes a pinch gesture. This may cause the controller 310 to update the optical assembly 320 with display instructions to change the temperature control indicator 712 (similar to the change described above).

In addition, the controller 310 may update the displayed temperature control indicator 712 while the user's hand 520 is moving in the outwards direction 812. The controller 310 may instruct the optical assembly 320 to move the display of the temperature control indicator 712 along the Z axis (590Z) to be a threshold distance from the user's hand in the artificial reality environment, or to maintain the same distance and relative position from the user's hand in the artificial reality environment. Additionally, the controller 310 may update the optical assembly 320 to display a virtual temperature indicator indicating the current temperature, similar to the temperature indicator 718.

Figure 8C:
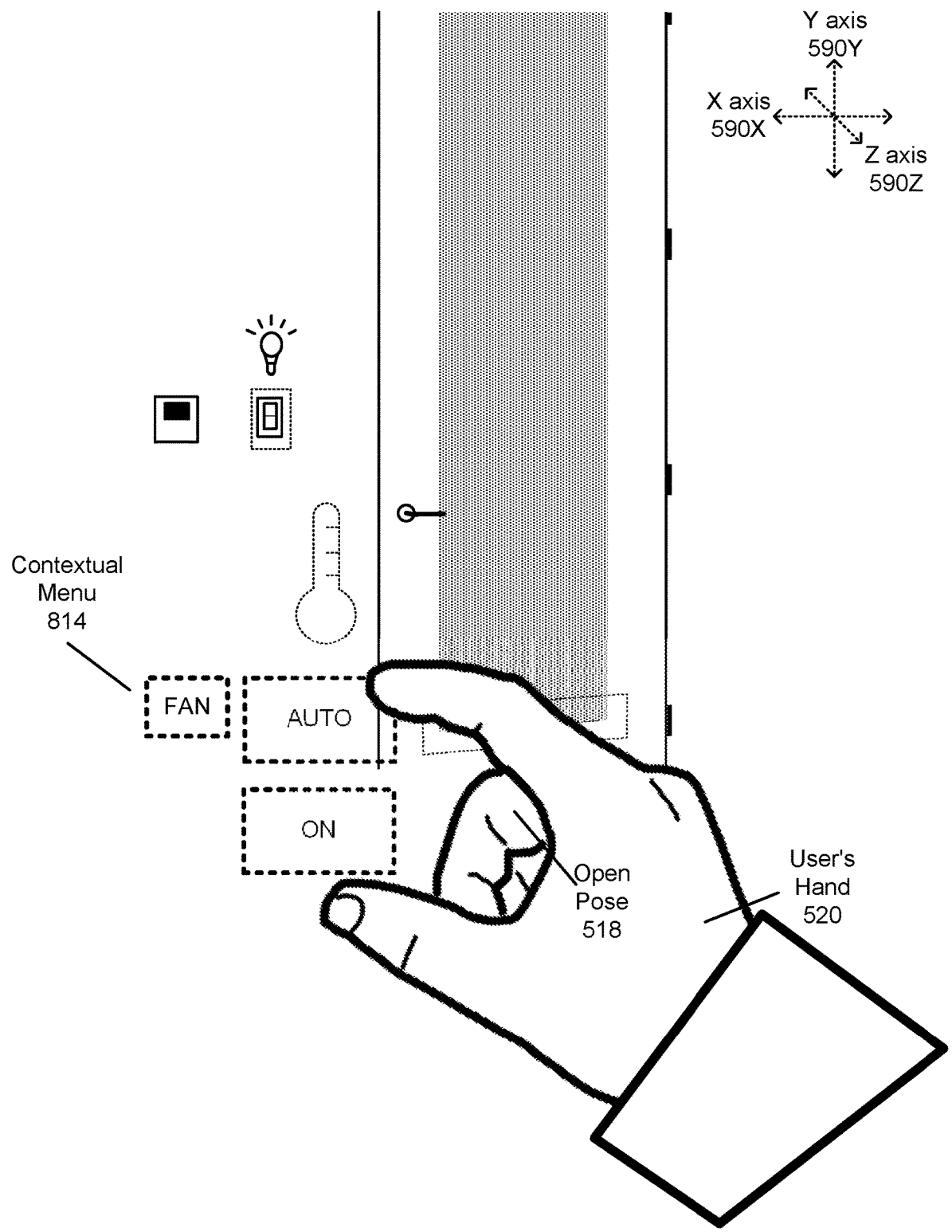
FIG. 8C illustrates an exemplary NED filter display applied to the NED of FIG. 8B during the display of the contextual menu, in accordance with one or more embodiments.

FIG. 8C illustrates the exemplary NED filter display applied to the NED 305 of FIG. 8B during the display of the contextual menu, in accordance with one or more embodiments. In FIG. 8C, the user's hand has exited the pinch gesture and has returned to the open pose 518. At the position where the user's hand returns to the open pose 518, the controller 110 updates the optical assembly 320 with instructions to display a contextual menu 814 in place of the temperature control indicator 712 shown in FIG. 7, at a position near to (e.g., within a set distance from) the position of the temperature control indicator 712 of FIG. 7. The contextual menu 814 includes one or more options related to the object which was the terminus of the user's gaze. In the illustrated example, since the temperature control 710 was the aforementioned object, the contextual menu 814 is related to the temperature control, and provides options for the fan to be set to "AUTO" or "ON."

The controller 310 may further detect that the user performs a touch gesture (not illustrated) with one of the options in the contextual menu. A touch gesture is formed when the user's hand forms a pose where one of the user's fingers is extended, and the finger is within a threshold distance (e.g., 2 mm) from the position of one of the contextual menu options in the contextual menu 814 in the artificial reality environment. Upon detecting a touch gesture with one of the contextual menu options of the contextual menu 814, the controller 310 transmits instructions to the temperature control 710 (or other object associated with the contextual menu 814) to execute instructions associated with the selected contextual menu option (e.g., turn fan to ON). The controller 310 may also transmit an update to the optical assembly 320 to remove the contextual menu 814 from display, and once again display the temperature control indicator 712 at its original position near the temperature control 710 in the artificial reality environment.

In one embodiment, the controller 310 may detect an action that indicates a cancellation of the contextual menu 814. This action may include a pinch gesture with a user's gaze for a separate object in the local area, or may include a touch gesture with an area adjacent to one of the contextual menu options of the contextual menu 814. This causes the controller 310 to also remove the contextual menu 814 from display (by sending instructions to the optical assembly 320). Alternatively, the contextual menu 814 may have a cancel option, and when the controller 310 detects a touch gesture with this cancel option, it removes the contextual menu 814 from the display.

FIG. 9A illustrates an exemplary NED filter display applied to a NED 305 prior to display of an informational menu due to a pinch gesture, in accordance with one or more embodiments. In FIG. 9A, the user's hand 520 is in an open pose 518. Additionally, the user's gaze passes within a threshold distance to the user's hand and terminates at the painting 910. Although the particular object at which the user's gaze terminates is a painting, in other embodiments it could be any other type of element. In one embodiment, the controller 310 also instructed the optical assembly 320 to display an indicator (not shown) near the painting 910 in the artificial reality environment.

Figure 9B:
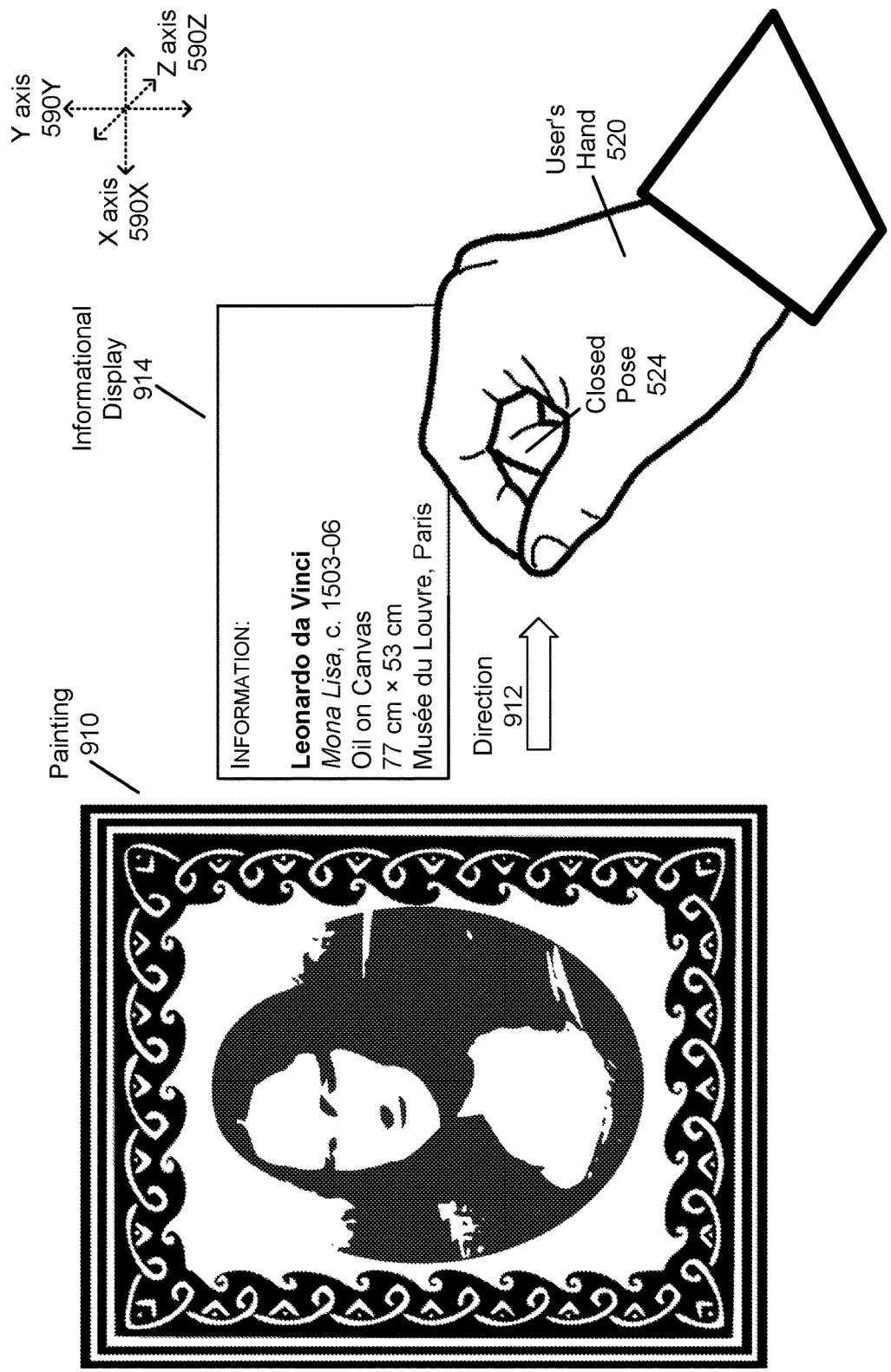
FIG. 9B illustrates an exemplary NED filter display applied to the NED of FIG. 9B during the display of the informational menu due to the pinch gesture, in accordance with one or more embodiments.

FIG. 9B illustrates an exemplary NED filter display applied to a NED of FIG. 9B during the display of the informational menu due to the pinch gesture, according to an embodiment. In FIG. 9B, the user's hand 520 has completed a pinch gesture and is in a closed pose 524 (the pinch gesture is described previously). Subsequently, the user's hand also moves to the right in the direction 912 substantially along the X axis (590X). The detected movement along the X axis (590X) of the user's hand 520 may also be known as a horizontal movement gesture.

Before the user's hand 520 is moved to the right, the controller 310 detects that the user's gaze intersects with the user's hand (between the distal ends of the user's index finger and thumb) and further terminates at the painting 910. Furthermore, the controller 310 detects that the user's hand 520 completes a pinch gesture.

Once the controller 310 detects that the user's hand 520 has moved to the right along direction 912 past a threshold distance, the controller 310 transmits an update to the optical assembly 320 to display an informational display 914 related to the object which was the terminus of the user's gaze, i.e., the painting 910. Here, the informational display 914 comprises information about the painting 910. The informational display 914 is displayed within a threshold distance of the object in the artificial reality environment (e.g., 5 cm), and is of a size such that the text or other information on the informational display 914 is legible to the user. Although the controller 310 causes the informational display 914 to appear when the user's hand 520 moves right along direction 912, in other embodiments, the informational display 914 may appear when the user's hand 520 moves in another direction, e.g. left.

Furthermore, in one embodiment, upon detecting that the user's hand 520 has exited the pinch gesture, that the user's gaze is focused on a different object, or that a touch gesture is detected with the informational display 914, the controller 310 transmits an update to the optical assembly 320 to remove the informational display 914.

Figure 10A:
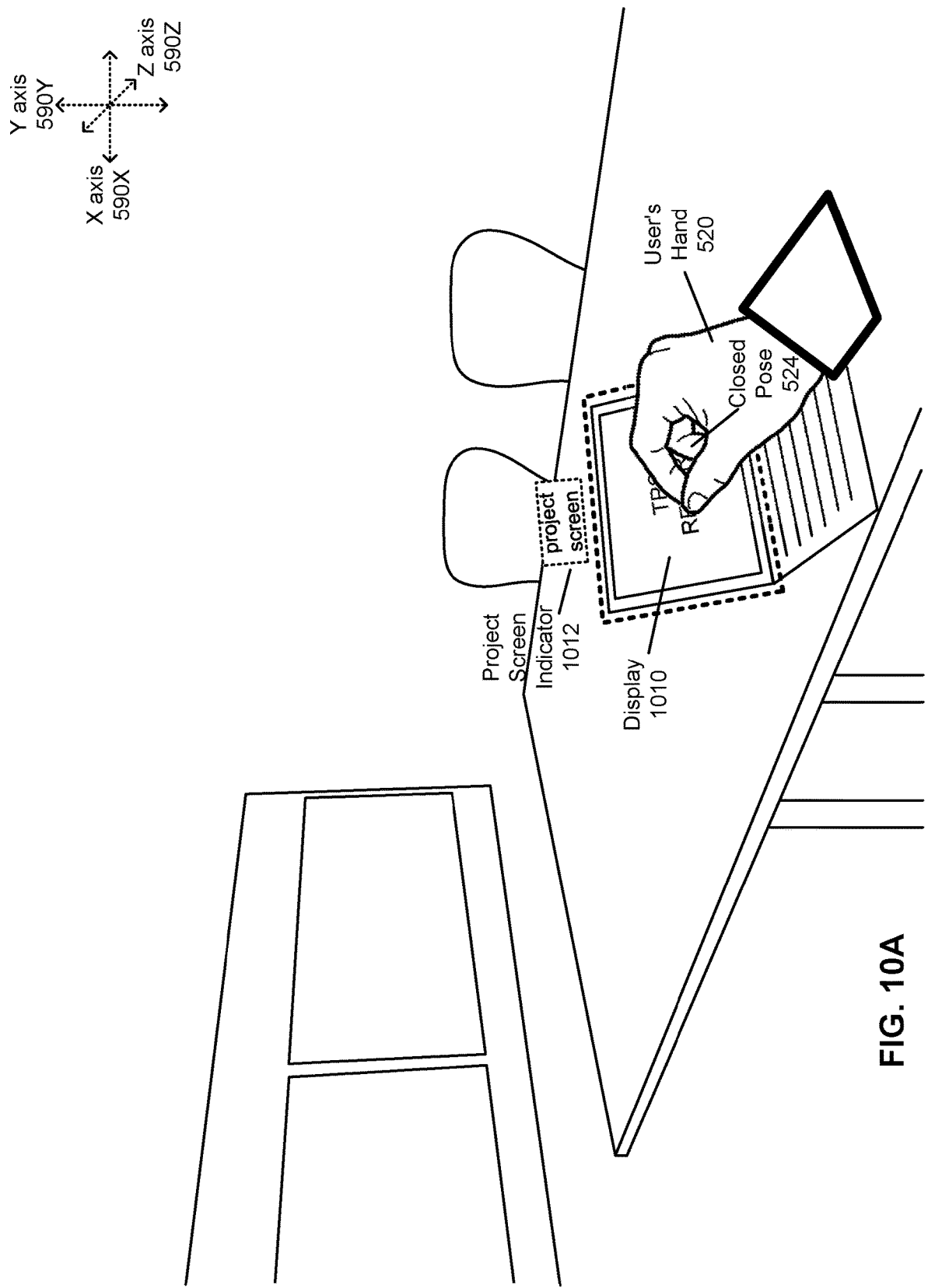
FIG. 10A illustrates an exemplary NED filter display applied to a NED prior to the manipulation of a projection using a pinch gesture with gaze, in accordance with one or more embodiments.

FIG. 10A illustrates an exemplary NED filter display applied to a NED 305 prior to manipulation of a projection using a pinch gesture with gaze, in accordance with one or more embodiments. In FIG. 10A, the user's hand 520 is in the closed pose 524. Additionally, the user's gaze intersects with a point between the distal ends of the index finger and thumb of the user's hand and terminates at the display 1010. Although the particular object at which the user's gaze terminates is a laptop display, in other embodiments it could be any other type of display element. In one embodiment, the controller 310 also instructs the optical assembly 320 to display a project screen indicator 1012 in the artificial reality environment near the display 1010. Upon detecting the pinch gesture with the user's hand at the current position, the controller 310 may further instruct the optical assembly 320 to display a change in the project screen indicator 1012. The project screen indicator 1012 may be designed to indicate to the user, via text or graphics, a capability to project the display, as illustrated.

Figure 10B:
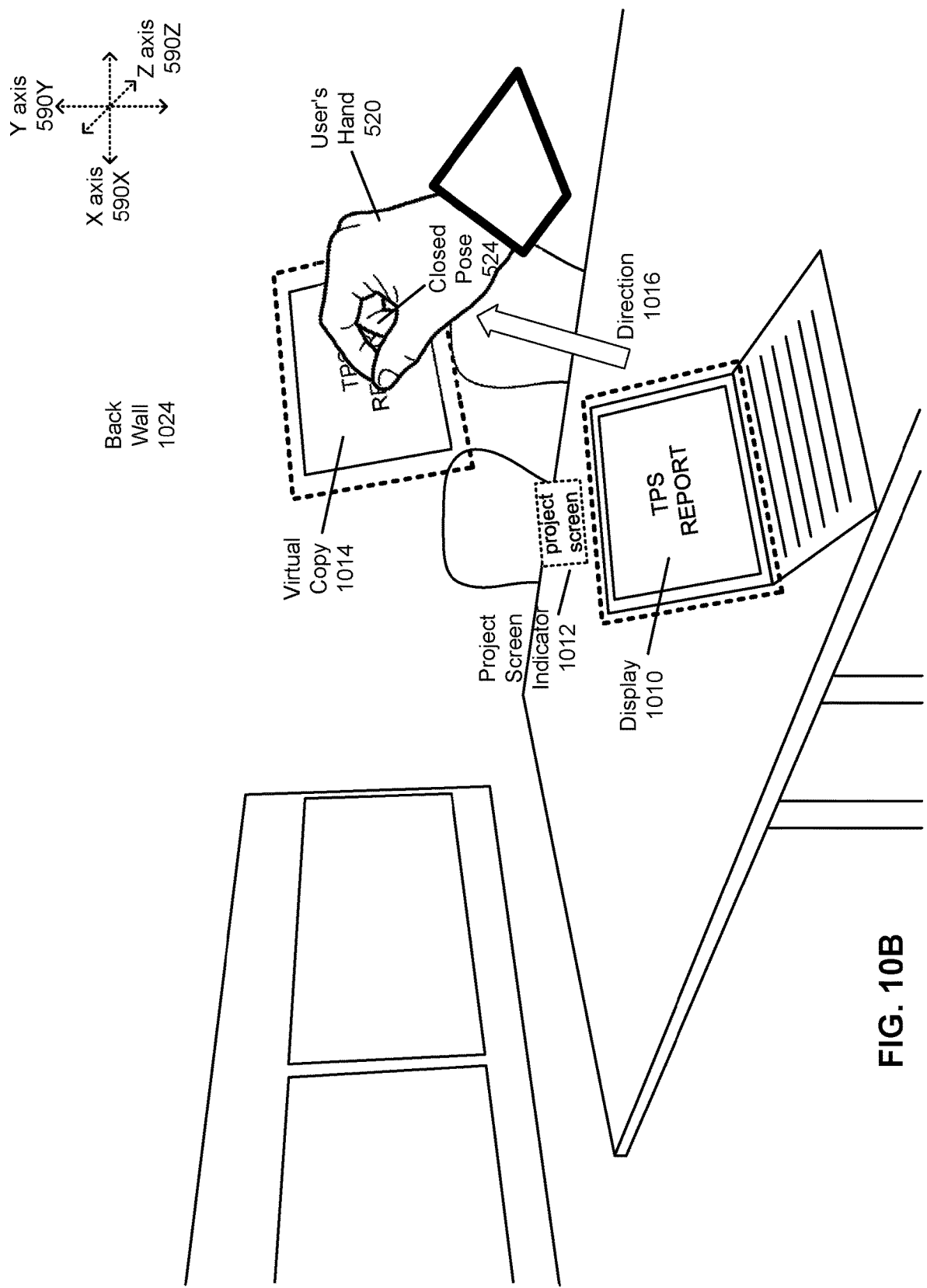
FIG. 10B illustrates an exemplary NED filter display applied to the NED of FIG. 10A during the manipulation of the projection using the pinch gesture with gaze, in accordance with one or more embodiments.

FIG. 10B illustrates the exemplary NED filter display applied to the NED 305 of FIG. 10A during the manipulation of the projection using the pinch gesture with gaze, in accordance with one or more embodiments. In FIG. 10B, the user's hand 520 is moving in a direction 1016 towards a back wall 1014 in the illustration. Upon detecting this movement, the controller 310 may transmit instructions to the optical assembly 320 to display to the user a virtual copy 1014 of the display 1010 at a threshold distance to the user's hand 520 in the artificial reality environment, as illustrated.

Figure 10C:
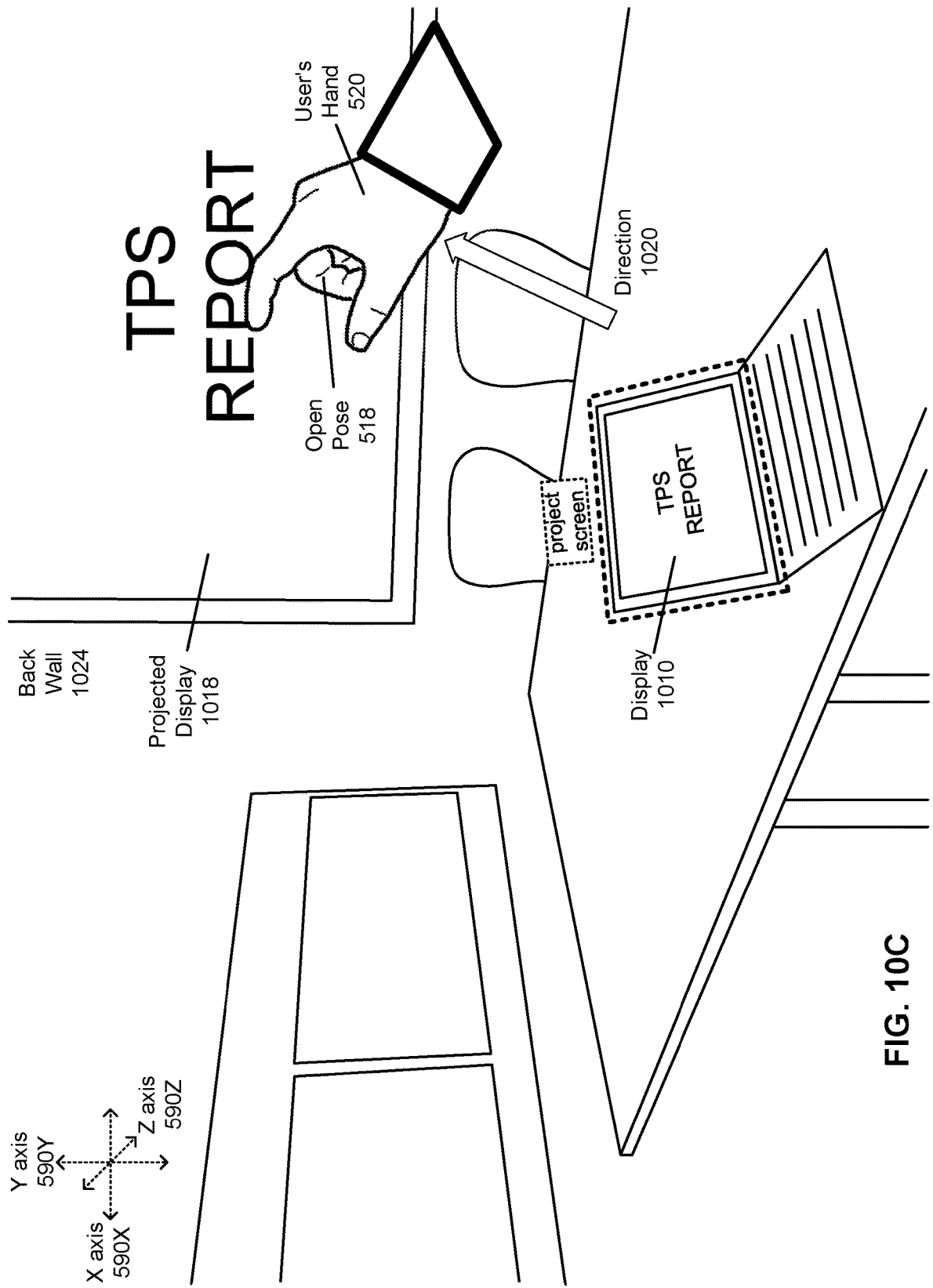
FIG. 10C illustrates an exemplary NED filter display applied to a NED of FIG. 10B after the manipulation of the projection using the pinch gesture with gaze, in accordance with one or more embodiments.

FIG. 10C illustrates the exemplary NED filter display applied to the NED 305 of FIG. 10B after the manipulation of the projection using the pinch gesture with gaze, in accordance with one or more embodiments. In FIG. 10C, the user's hand has exited the pinch gesture. Additionally, the user's hand performs a throw gesture. This throw gesture includes the pinch gesture, movement of the user hand, and then an exit of the pinch gesture by the user's hand (i.e., back to an open pose 518). In one embodiment, the throw gesture is only detected when the movement of the user's hand exceeds a threshold speed. The projection of the user's hand from the user's eye position terminates at the back wall 1024.

When the controller 310 detects the throw gesture, the controller 310 executions instructions to perform some action against the target of the throw gesture, which in this case is the back wall 1024. In one embodiment, the instructions are for the controller 310 to determine whether the projection of the path of the movement of the user's hand at the position at which the pinch gesture is released ends at a projectable surface. In another embodiment, the target may be determined by detecting where the user's gaze-orientation is pointed, with the terminus of the gaze orientation being the target. The controller 310 may store a list of projectable surfaces in the local area. These surfaces can be projected onto due to a projector or display being available to display images on that surface.

In the illustrated example, the back wall 1024 can be projected onto using a projector. Thus, the controller 310 instructs the laptop that is part of the display 1010 to transmit a mirror of display 1010 to the projector to project the display 1010 as the projected display 1018 on the back wall 1024.

In one embodiment, the controller 310 can also detect that the user's gaze intersects with the pinch gesture of the user's hand and terminates at the projected display 1018. The controller 310 also detects a movement of the user's hand 520 while still performing the pinch gesture to a position where a projection of the user's hand does not terminate at a projectable surface in the local area (e.g., on a wall or surface that does not have an associated projector or display). In such a case, the controller 310 may transmit instructions to the projector of the projected display 1018 to disable the projection.

Figure 10D:
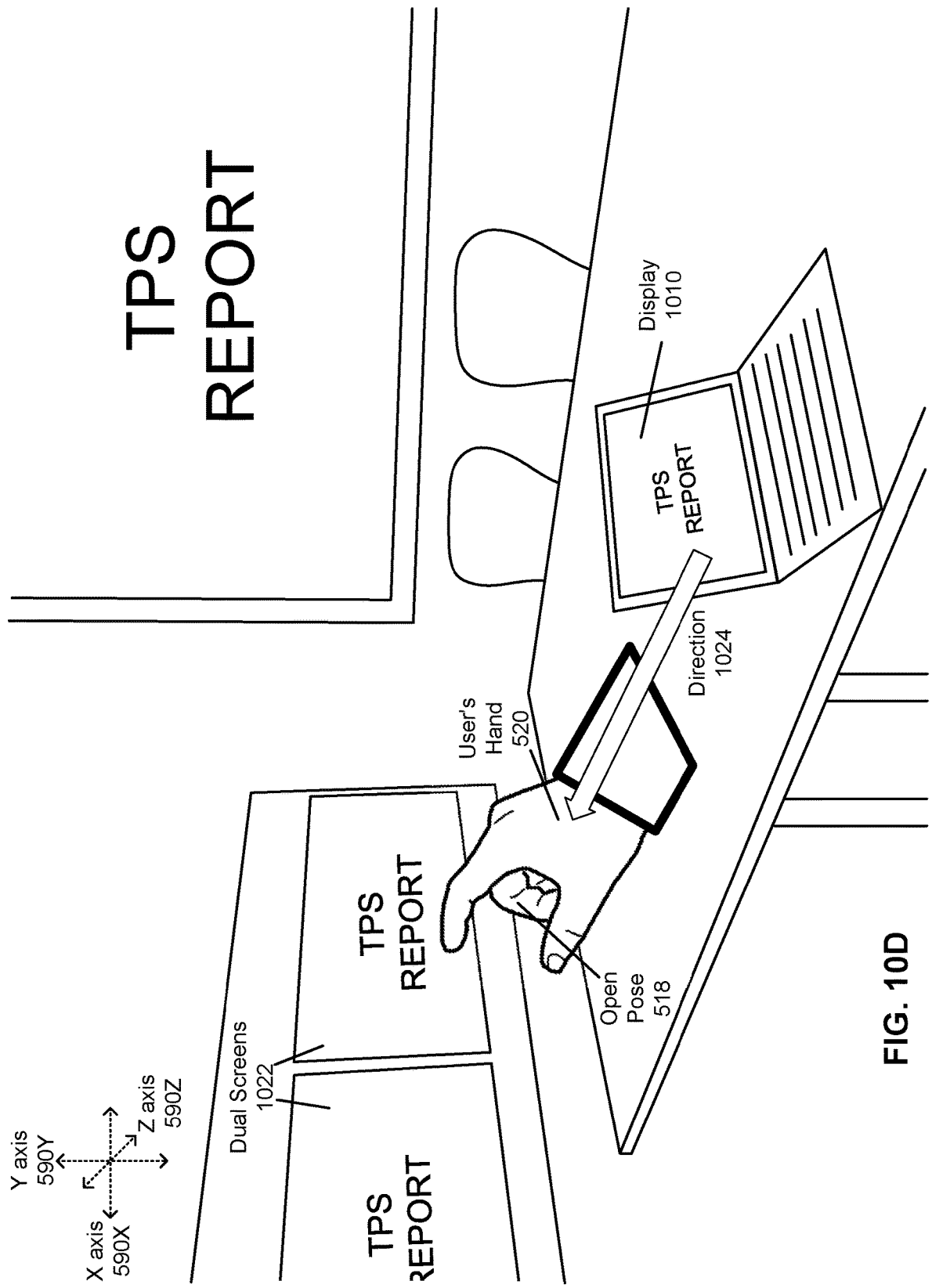
FIG. 10D illustrates an exemplary NED filter display applied to a NED of FIG. 10B after an alternative manipulation of the projection using a pinch gesture with gaze, in accordance with one or more embodiments.

FIG. 10D illustrates the exemplary NED filter display applied to the NED 305 of FIG. 10B after an alternative manipulation of the projection using the pinch gesture with gaze, in accordance with one or more embodiments. In FIG. 10D, the user's hand performs a similar "throw" of the display 1010 as shown previously in FIG. 10C, however this time the pinch gesture of the user's hand 520 is released at the dual screens 1022. The controller 310 detects the projected terminus of the user's hand 520 in this case as the dual screens 1022, and instructs the laptop of the display 1010 to transmit a copy of the display 1010 to the dual screens 1022.

Exemplary Flow

Figure 11:
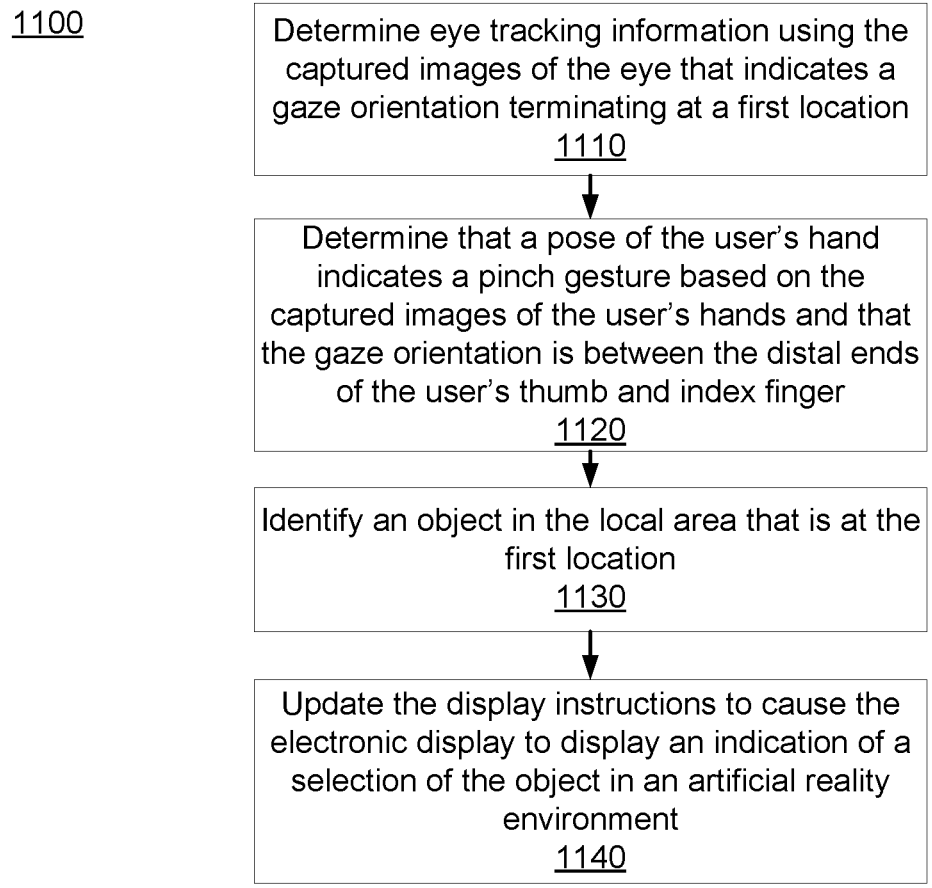
FIG. 11 is a flowchart illustrating a method for providing long distance object manipulation in a NED, in accordance with one or more embodiments.

FIG. 11 is a flowchart illustrating a method for providing long distance object manipulation in a NED system, according to an embodiment. In one embodiment, the steps in the flowchart may be performed by the controller 310. In another embodiment, the steps may be performed by another component as described in the system 300. Although a particular order is implied by the flowchart, in other embodiments the steps in the flowchart may be performed in a different order.

The controller 310 determines 1110 eye tracking information using the captured images of the eye. The eye tracking information indicating a gaze orientation and the gaze orientation terminates at first location. For example, that first location may be an object in the local area.

The controller 310 determines 1120 that a pose of the user's hand indicates a pinch gesture based on the captured images of the user's hands. The pinch gesture is formed by a movement of the user's thumb and index finger such that the distance between the distal ends of the user's thumb and index finger are within a threshold value. Furthermore, the previously noted gaze orientation is between the distal ends of the user's thumb and index finger, i.e., the gaze of the user passes between the user's thumb and index fingers (and terminates at the location).

The controller 310 identifies 1130 an object in the local area that is at the first location. For example, the object may be a switch, display element, actuator, etc. This object may be coupled to the NED system via a communications interface that allows the controller 310 to control or configure the object.

The controller 310 updates 1140 display instructions to cause an electronic display of an optical assembly (e.g., optical assembly 320) of the NED system to display an indication of a selection of the object in an artificial reality environment. The indication of the selection is displayed within a threshold distance of a position of the object in the artificial reality environment. The user may then manipulate the object by performing various gestures, such as a pinch gesture, and moving his or her hand in various directions. For example, by performing a pinch gesture, and moving the hand down, the user may be able to adjust a switch located at the termination of the user's gaze to turn off. This may be accomplished when the controller 310 detects the user's gesture and hand movement and transmits an instruction to the switch or other control unit to turn off the target indicated by the switch.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure. For example, although specific objects are used as examples in the scenarios illustrated in the above figures, these objects can be interchanged with other objects to achieve similar effects.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
  a near eye display (NED) comprising:
    an optical assembly having an electronic display that is configured to display images in accordance with display instructions;
    an imaging sensor configured to capture images of a user's hands; and
    an eye imaging sensor configured to capture images of an eye of the user as the eye looks into a local area surrounding the NED; and
  a controller configured to:
    determine eye tracking information using the captured images of the eye, the eye tracking information indicating a gaze orientation, wherein the gaze orientation terminates at a first location;
    determine that a pose of the user's outstretched hand indicates a pinch gesture based on the captured images of the user's hands, the pinch gesture formed by a movement of the user's thumb and index finger such that a distance between the distal ends of the user's thumb and index finger are within a threshold value, and that the gaze orientation is between the distal ends of the user's thumb and index finger;
    in response to the determination that the gaze orientation terminates at the first location and that the gaze orientation is between the distal ends of the user's thumb and index finger which have formed a pinch gesture:
      identify a physical object in the local area that is at the first location; and
      update the display instructions to cause the electronic display to display an indication of a selection of the object in an artificial reality environment, the indication of the selection within a threshold distance of a position of the object in the artificial reality environment.

2. The system of claim 1, wherein the controller is further configured to:
  transmit one or more executable instructions to the object, the executable instructions to be executed by the object in response to the pinch gesture.

3. The system of claim 1, wherein the controller is further configured to:
  transmit one or more executable instructions to a device associated with the object, the executable instructions to be executed by the device in response to the pinch gesture.

4. The system of claim 1, wherein the controller is further configured to:
  determine that the pose of the user's hand indicates a vertical movement gesture, the vertical movement gesture formed by a movement of the user's hand in a vertical direction; and
  transmit executable instructions to the object to cause a change in the object corresponding to the direction of the vertical movement gesture.

5. The system of claim 4, wherein the controller is further configured to:
  update the display instructions to cause the electronic display to display an indication of the change in the artificial reality environment, the indication of the change within a threshold distance of the position of the object in the artificial reality environment.

6. The system of claim 1, wherein the controller is further configured to:
  determine that the pose of the user's hand indicates a horizontal movement gesture, the horizontal movement gesture formed by a movement of the user's hand in a horizontal direction; and
  update the display instructions to cause the electronic display to display an information element associated with the object at a position in an artificial reality environment that is within a threshold distance of the position of the object in the artificial reality environment.

7. The system of claim 1, wherein the controller is further configured to:
  determine that the pose of the user's hand indicates a movement in a two dimensional (2D) plane orthogonal within a threshold degree to a straight path corresponding to the gaze orientation of the user; and
  transmit executable instructions to the object to cause a change in the object corresponding to the direction of the movement gesture in the 2D plane.

8. The system of claim 1, wherein the controller is further configured to:
  determine that the pose of the user's hand indicates a push-pull movement gesture, the push-pull movement formed by a movement of the user's hand along a direction parallel within a threshold degree to a straight path corresponding to the gaze orientation of the user; and
  transmit executable instructions to the object to cause a change in the object corresponding to the direction of the push-pull movement gesture.

9. The system of claim 1, wherein the controller is further configured to:
  determine that the pose of the user's hand indicates a push-pull movement gesture, the push-pull movement formed by a movement of the user's hand along a direction parallel within a threshold degree to the straight path corresponding to the gaze orientation of the user; and
  update the display instructions to cause the electronic display to display a simulated contextual menu associated with the object at a position in the artificial reality environment that is a threshold distance from a position of the user's hand in the artificial reality environment.

10. The system of claim 9, wherein the controller is further configured to:
  determine that the pose of the user's hand indicates a touch gesture that intersects with one of the contextual menu options of the simulated contextual menu, the touch gesture formed by a movement of at least one of the user's fingers to be within a threshold distance of the one of the contextual menu options; and
  transmit executable instructions to the object to cause a change in the object corresponding to the intersected contextual menu option.

11. The system of claim 1, wherein the controller is further configured to:
  determine that the pose of the user's hand indicates a throw gesture, the throw gesture formed by a first movement of the user's hand in a direction at a movement speed beyond a threshold value and a second movement of an increase in the distance between the user's index finger and thumb beyond a threshold value, the second movement occurring within a threshold interval of the first movement; and transmit executable instructions to the object to cause a change in the object based on the direction of the first movement of the throw gesture.

12. The system of claim 11, wherein the controller is further configured to:
identify a target indicated by the direction of the first movement of the throw gesture; and
wherein the executable instructions cause the object to execute an action against the target.

13. The system of claim 11, wherein the target is a surface on which a selected image presentation device may present an image, wherein the object includes a display, and wherein the executable instructions cause the object to transmit a signal to the selected image presentation device to present images that are also presented on the display of the object.

14. A near eye display (NED), comprising:
an optical assembly having an electronic display configured to display images in accordance with display instructions;
an imaging sensor configured to capture images of a user's hands; and
an eye imaging sensor configured to capture images of an eye of the user as the eye looks into a local area surrounding the NED; and
a controller configured to:
determine eye tracking information using the captured images of the eye, the eye tracking information indicating a gaze orientation, wherein the gaze orientation terminates at first location;
determine that a pose of the user's outstretched hand indicates a pinch gesture based on the captured images of the user's hands, the pinch gesture formed by a movement of the user's thumb and index finger such that a distance between the distal ends of the user's thumb and index finger are within a threshold value, and that the gaze orientation is between the distal ends of the user's thumb and index finger;
in response to the determination that the gaze orientation terminates at the first location and that the gaze orientation is between the distal ends of the user's thumb and index finger which have formed a pinch gesture:
identify a physical object in the local area that is at the first location; and
update the display instructions to cause the electronic display to display an indication of a selection of the object in an artificial reality environment, the indication of the selection within a threshold distance of a position of the object in the artificial reality environment.

15. The NED of claim 14, wherein the controller is further configured to:
transmit one or more executable instructions to the object, the executable instructions to be executed by the object in response to the pinch gesture.

16. The NED of claim 14, wherein the controller is further configured to:
determine that the pose of the user's hand indicates a vertical movement gesture, the vertical movement gesture formed by a movement of the user's hand in a vertical direction; and
transmit executable instructions to the object to cause a change in the object corresponding to the direction of the vertical movement gesture.

17. The NED of claim 16, wherein the controller is further configured to:
update the display instructions to cause the electronic display to display an indication of the change in the artificial reality environment, the indication of the change within a threshold distance of the position of the object in the artificial reality environment.

18. The NED of claim 14, wherein the controller is further configured to:
determine that the pose of the user's hand indicates a horizontal movement gesture, the horizontal movement gesture formed by a movement of the user's hand in a horizontal direction; and
update the display instructions to cause the electronic display to display an information element associated with the object at a position in an artificial reality environment that is within a threshold distance of the position of the object in the artificial reality environment.

19. The NED of claim 14, wherein the controller is further configured to:
determine that the pose of the user's hand indicates a push-pull movement gesture, the push-pull movement formed by a movement of the user's hand along a direction parallel within a threshold degree to the straight path corresponding to the gaze of the user; and
update the display instructions to cause the electronic display to display a simulated contextual menu associated with the object at a position in the artificial reality environment that is a threshold distance from a position of the user's hand in the artificial reality environment.

20. The NED of claim 14, wherein the controller is further configured to:
determine that the pose of the user's hand indicates a throw gesture, the throw gesture formed by a first movement of the user's hand in a direction at a movement speed beyond a threshold value and a second movement of an increase in the distance between the user's index finger and thumb beyond a threshold value, the second movement occurring within a threshold interval of the first movement; and
transmit executable instructions to the object to cause a change in the object based on the direction of the first movement of the throw gesture.

* * * * *